(12) United States Patent
Hall

(10) Patent No.: US 6,583,959 B1
(45) Date of Patent: Jun. 24, 2003

(54) READ WRITE HEAD ASSEMBLY HAVING AIR BEARING FEATURES FOR CONTAMINANT CONTROL IN FLEXIBLE MEDIA HEAD-DISK INTERFACE

(75) Inventor: David L. Hall, Salt Lake City, UT (US)

(73) Assignee: Iomega Corporation, Roy, UT (US)

( * ) Notice: Subject to any disclaimer, the term of this patent is extended or adjusted under 35 U.S.C. 154(b) by 233 days.

(21) Appl. No.: 09/665,039

(22) Filed: Sep. 19, 2000

(51) Int. Cl.⁷ .............................. G11B 5/60; G11B 17/32

(52) U.S. Cl. ................................. 360/234.2; 360/236.6; 360/236.9

(58) Field of Search .......................... 360/99.01, 234.2, 360/236.6, 236.9

(56) References Cited

U.S. PATENT DOCUMENTS

| | | | |
|---|---|---|---|
| 3,855,625 A | 12/1974 | Garnier et al. | 360/235.6 |
| 3,961,372 A | 6/1976 | Brock et al. | 360/130.24 |
| 4,375,656 A | 3/1983 | Radman, Jr. et al. | 360/235.4 |
| 4,414,592 A | 11/1983 | Losee et al. | 360/221 |
| 4,419,705 A | 12/1983 | Brower et al. | 360/235.3 |
| 4,636,898 A | 1/1987 | Suzuki et al. | 360/122 |
| 4,646,180 A | 2/1987 | Ohtsubo | 360/236.6 |
| 4,663,682 A | 5/1987 | McNeil | 360/255.6 |
| 4,673,996 A | 6/1987 | White | 360/236.7 |
| 4,700,248 A | 10/1987 | Coughlin et al. | 360/224 |
| 4,757,402 A | 7/1988 | Mo | 360/235.4 |
| 4,814,906 A | 3/1989 | Suzuki et al. | 360/75 |
| 4,870,519 A | 9/1989 | White | 360/236.7 |
| 4,901,173 A | 2/1990 | Jones et al. | 360/99.04 |
| 4,912,582 A | 3/1990 | Gomi et al. | 360/99.01 |
| 4,928,196 A | 5/1990 | Hickok | 360/246.8 |
| 4,974,106 A | 11/1990 | White et al. | 360/234.2 |

(List continued on next page.)

FOREIGN PATENT DOCUMENTS

| | | |
|---|---|---|
| JP | 60-109073 | 6/1985 |
| JP | 61-057087 | 3/1986 |
| JP | 61-273784 | 12/1986 |
| JP | 63-255883 | 10/1988 |
| JP | 63-298879 | 12/1988 |
| JP | 02-049280 | 2/1990 |
| JP | 03-248380 | 11/1991 |
| JP | 04-069875 | 3/1992 |

OTHER PUBLICATIONS

Chhabra, D.S. et al., "Air Bearing Design Considerations for Constant Fly Height Applications", *IEEE Trans. Magnetics*, 1994, 30(2), 417–423.

*Primary Examiner*—Jefferson Evans
(74) *Attorney, Agent, or Firm*—Woodcock Washburn LLP

(57) ABSTRACT

An improved head assembly having air bearing features for contaminant control in flexible media high contact-pressure zone. The head assembly having one or more air bearing features for improving the performance of the heads by controlling a flow of contaminants away from the head sensor and the high contact-pressure zone. The improved head assembly having air bearing features allows the head to keep contaminants out of the high contact-pressure zone proximate the head disk interface where the sensor communicates (e.g., contacts) the flexible media. The head assembly of the present invention includes a shaped slot air bearing feature formed in the rail having the sensor that directs the flow of contaminants away from the high contact-pressure zone and therefore, away from the sensor. This helps to prevent problems associated with head spacing and also damage to the head, the disk, and/or both. In addition, the present invention can also include an additional shaped slot air bearing feature positioned by the sensor. In another embodiment of the present invention, the head assembly has a shaped rail air bearing feature for controlling a flow of contaminants from entering the high contact-pressure zone and away from the sensor.

15 Claims, 15 Drawing Sheets

U.S. PATENT DOCUMENTS

| | | | |
|---|---|---|---|
| 4,975,794 A | 12/1990 | Losee et al. | 360/246.2 |
| 5,065,500 A | 11/1991 | Yoneda et al. | 29/603.12 |
| 5,086,360 A | 2/1992 | Smith et al. | 360/236.6 |
| 5,184,263 A | 2/1993 | Fukakusa et al. | 360/75 |
| 5,189,574 A | 2/1993 | Imamura et al. | 360/234.2 |
| 5,220,470 A | 6/1993 | Ananth et al. | 360/235.6 |
| 5,235,483 A | 8/1993 | Hayakawa et al. | 360/246.2 |
| 5,237,472 A | 8/1993 | Morehouse et al. | 360/254.8 |
| 5,636,085 A | 6/1997 | Jones et al. | 360/236.6 |
| 5,650,891 A | 7/1997 | Thayne et al. | 360/99.06 |
| 6,023,393 A | 2/2000 | White | 350/234.2 |
| 6,115,219 A | 9/2000 | Hall | 360/234.2 |

Increase in Spacing
Zip™ Heads v. Heads of This Invention

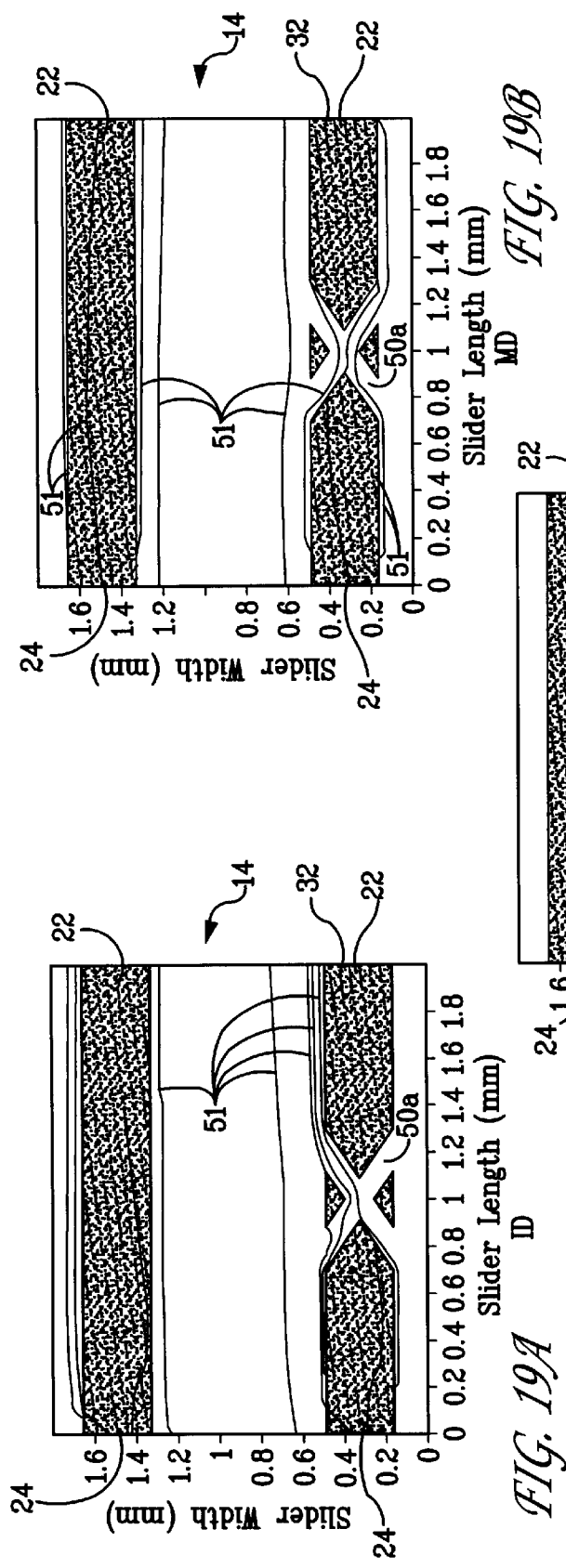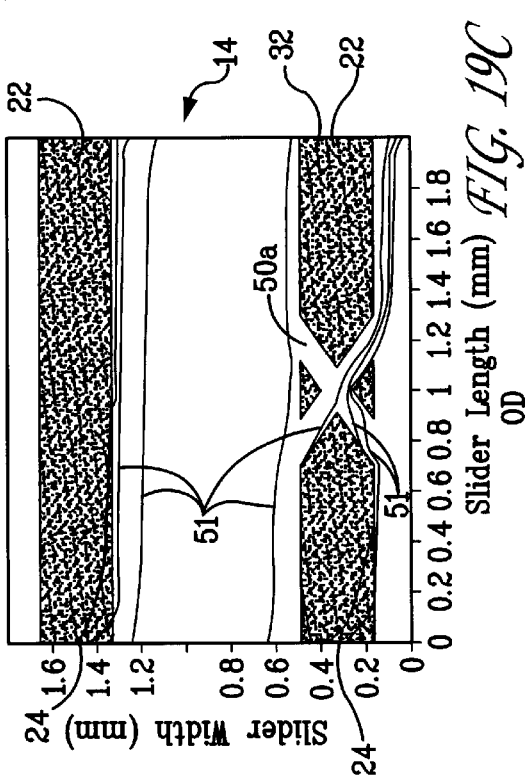
FIG. 19A
FIG. 19B
FIG. 19C

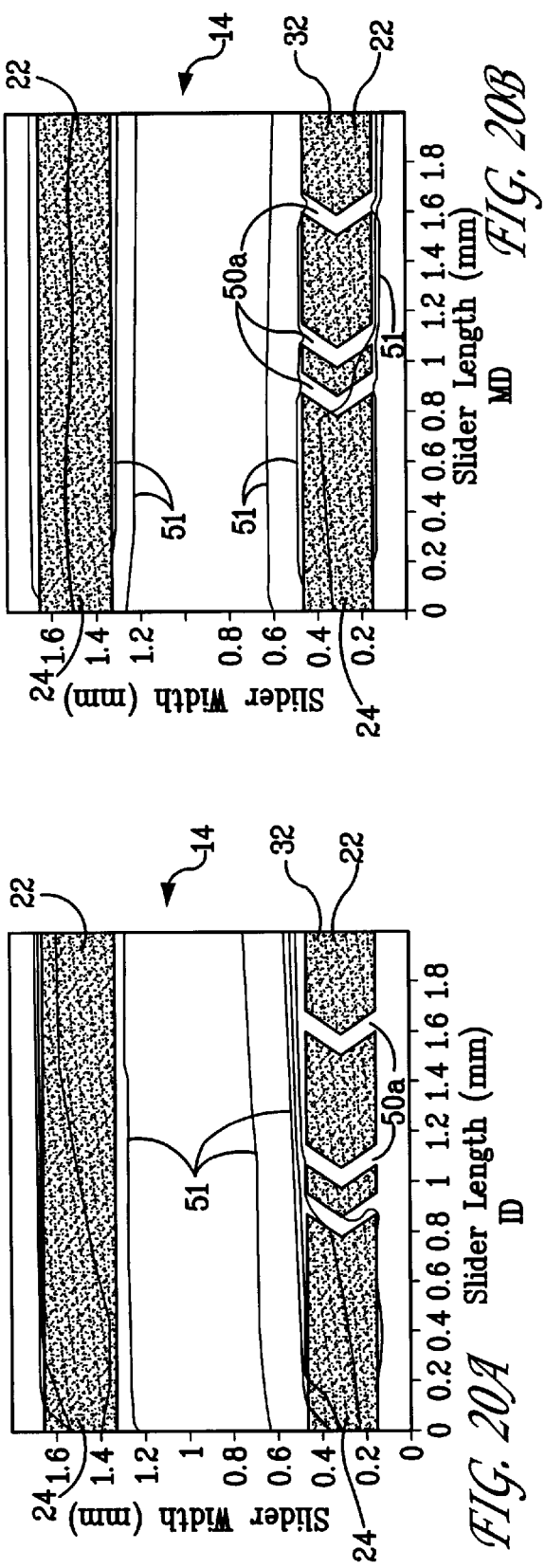
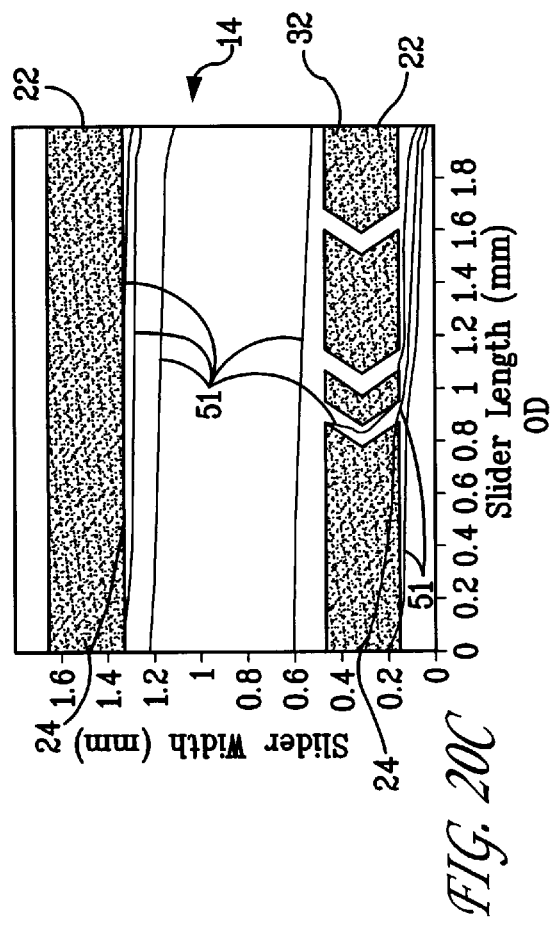
FIG. 20A
FIG. 20B
FIG. 20C

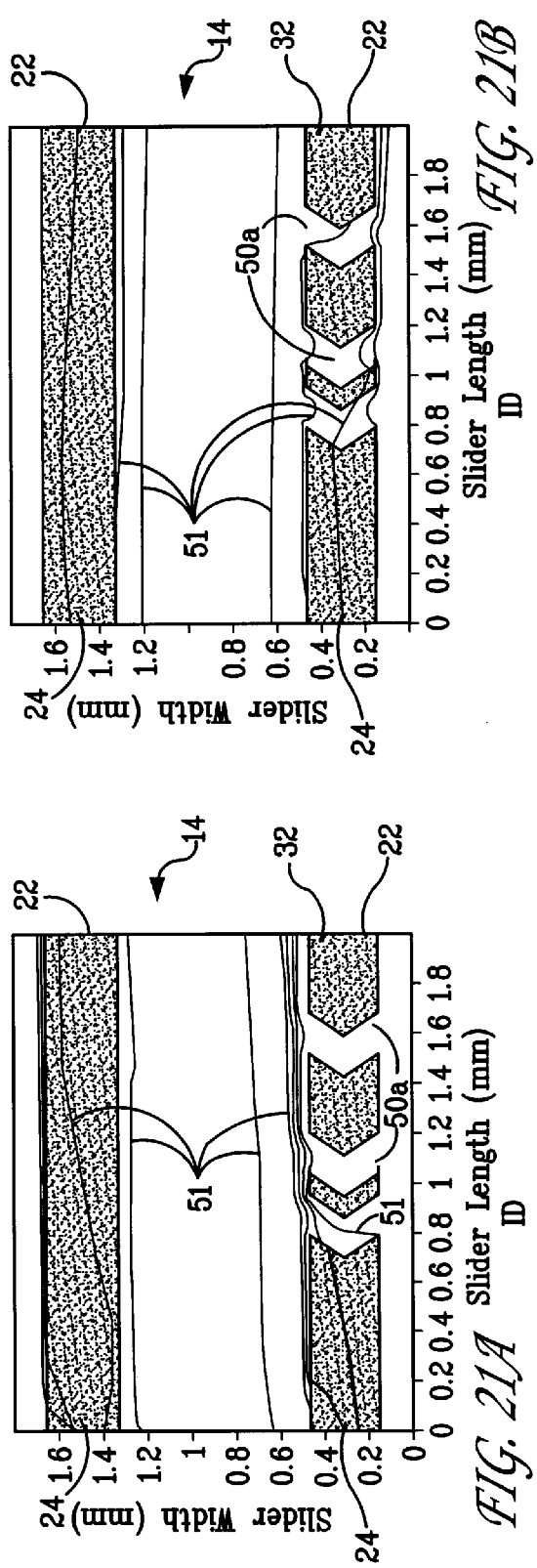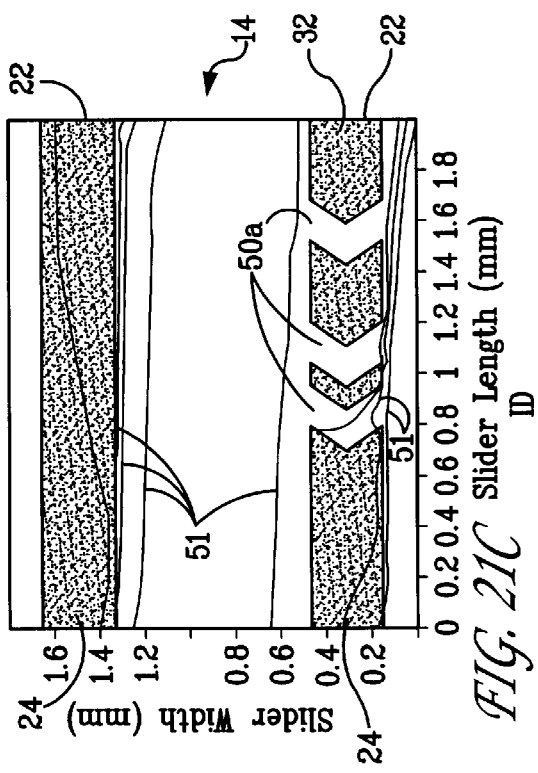
FIG. 21A   FIG. 21B   FIG. 21C

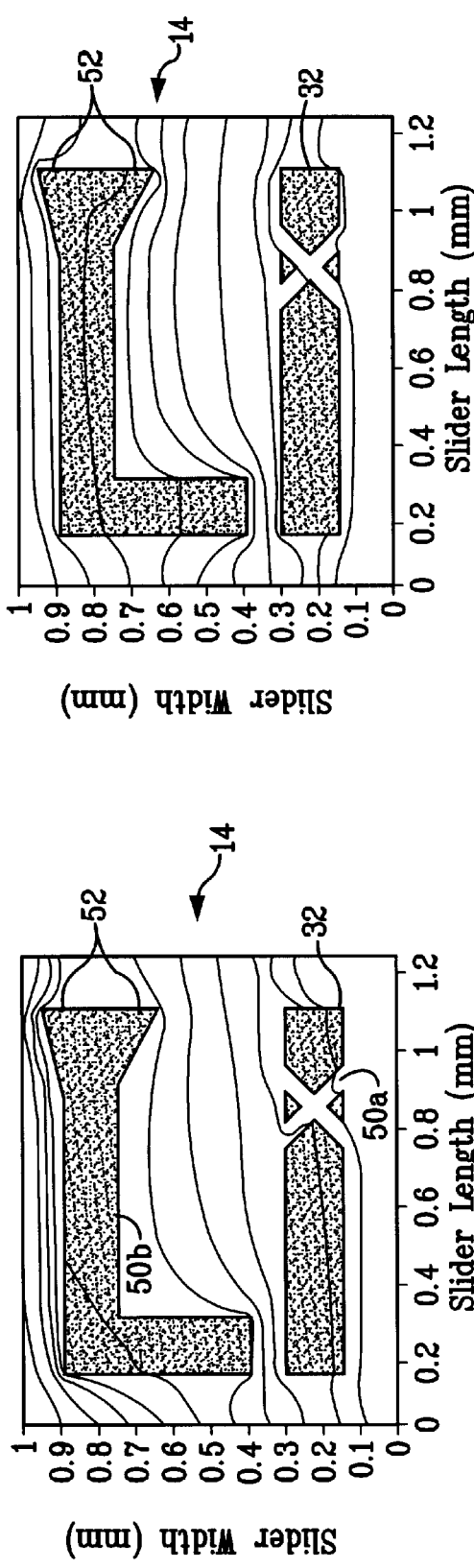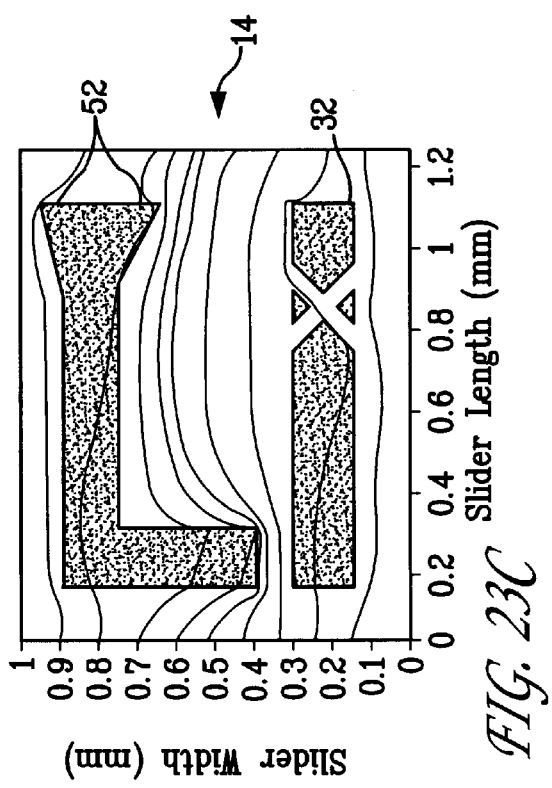
FIG. 23A
FIG. 23B
FIG. 23C

READ WRITE HEAD ASSEMBLY HAVING AIR BEARING FEATURES FOR CONTAMINANT CONTROL IN FLEXIBLE MEDIA HEAD-DISK INTERFACE

FIELD OF THE INVENTION

The present invention relates in general to improved head assemblies for reading/writing data on a storage medium, and particularly, to a magnetic head assembly for use with a flexible magnetic storage medium. This invention also relates to actuators and disk drives that employ the improved head assemblies.

BACKGROUND OF THE INVENTION

Disk drives of the type that receive a disk media having a data storage medium typically have a head assembly for communicating with the storage medium. The storage medium may be disc shaped, and if so, the data storage cartridge may be referred to as a disk cartridge. The data storage medium may be of the type that is removable from the disk drive, and if so, it may be referred to as a removable disk cartridge. The head assembly may include a pair of sliders. Each slider is typically mounted on an actuator that is mounted within a disk drive. Additionally, each of the sliders may have a read/write head for interfacing with a storage medium of a disk cartridge. The sliders are also commonly referred to as read/write heads.

Generally, the actuator on which the head assembly is mounted moves between a retracted position and an interfacing position. In the retracted position, the heads are disposed in a position that minimizes the likelihood of damage to the heads from either dynamic or static forces. When a disk cartridge has not been inserted into the disk drive, the actuator holds the heads in this retracted position. When a disk cartridge is inserted into the disk drive, the actuator moves the heads to the interfacing position. In the interfacing position, the actuator is in a position in which the heads can interface with the storage medium that has been inserted into the disk drive.

The storage medium with which the head assembly may interface may have a top surface and a bottom surface. Preferably, in the interacting position the storage medium is disposed between the sliders of the head assembly. One of the sliders may be disposed proximal to the top surface, and one of the sliders may be disposed proximal to the bottom surface. In operation, the storage medium of the disk cartridge is rotated between the sliders and an air bearing is created between the storage medium and the sliders. As the storage medium is rotated, the heads "ride" on these air bearings and the heads interface with the storage medium.

The design of head assemblies is significant because it affects the ability of the heads to interface with the storage medium of the disk drive. In particular, the ability of the heads to interface with the storage medium is a function of the spacing between the sliders and the storage medium. The spacing between the sliders and the media is important because it affects the ability of the disk drive to communicate with the media. Ordinarily, the sliders fly very low with respect to the media. As the distance between the media and the sliders increases, the signal degrades. With the development of higher density media, it is desired to develop sliders that have even lower fly heights then those previously developed.

For instance, one of the concerns when designing head assemblies is that the spacing between the read/write heads and the storage medium be relatively constant. If the spacing between the read/write heads and the storage medium is not relatively constant, this can cause a degradation in the ability of the heads to interface with the storage medium. The importance of maintaining the spacing between the storage medium and the heads relatively constant is even more pronounced in disk cartridges that have storage mediums with a relatively high density.

In order to maintain an appropriate spacing between the read/write heads and the storage medium, the air bearing created between the slider and the storage medium must be relatively constant. At high speeds, the flexible storage medium tends to flutter and therefore the importance of maintaining the spacing between the read/write heads and the storage medium is even more pronounced at high speeds. In addition to being dependent on the speed of rotation of the storage medium, the air bearing is a function of the geometry of the head assemblies and the storage medium. Therefore, the geometry of these components is of particular importance.

In addition to affecting the performance of the head assembly, the spacing between the head assembly and the storage medium also affects the life of both the read/write heads and the storage medium. For instance, if the storage medium fluctuates, the storage medium and the heads may wear unevenly and their respective lives may be reduced. Furthermore, if the air bearing pressure is relatively high, the storage medium and the heads will wear at a faster rate. The amount of fluctuation of the storage medium is a function of the geometry of the head assembly and the storage medium. Manufacturing imperfections in the design of head assemblies and variations in head assemblies due to large design tolerances have the potential to cause an imbalance of forces between the head assembly and the storage medium and subsequent fluctuations of the storage medium. Therefore, it is important to design head assemblies, so that the manufacturing tolerances are relatively low and the likelihood of manufacturing imperfections are reduced.

Previous designs of magnetic head assemblies are exemplified in U.S. Pat. No. 5,636,085 (Jones et al.), entitled "Magnetic Read/Write Head Assembly Configuration With Bleed Slots Passing Through Rails To Stabilize Flexible Medium While Attaining Low Fly Heights With Respect Thereto," and U.S. Pat. No. 4,974,106 (White et al.), entitled "Non-Contact Magnetic Head Assembly For A Flexible Medium Disk Drive." Jones et al., which is also owned by the assignee of the invention described in this application, and White et al. both describe magnetic head assemblies. The inventions described in these patents are directed to improved magnetic head assemblies, but may be used with other types of head assemblies such as optical head assemblies.

Recently, higher density storage media has been and is being developed. Previously, the Iomega Zip® disk cartridge was considered to have a relatively high density. Even higher density magnetic media are being developed. The sliders and head assembly disclosed in the Jones et al. patent was designed to interface with the magnetic media, such as the Zip® 100 disk cartridge. Although the sliders taught by Jones et al. have been sufficient for use with disk cartridges that have the density about equal to that of the Zip® 100 disk cartridges, the advent of higher density magnetic media requires sliders that can better communicate with higher density media.

The sliders, described in Jones et al., have a relatively low fly height. However, this fly height has proven to be too great for operation with higher density media. The head assembly of this invention improves upon that of Jones et al. to improve the ability of the disk drive to communicate with higher density media.

In addition, contaminants entering the high contact-pressure zone of the head-disk interface can also lead to decreased performance of the head assembly due to increased spacing. Contaminants that may be introduced into the cartridge can cause decreased performance of the cartridge by, for example, increasing the spacing between the heads and the disk surface (e.g., fly height), producing phantom writes, damaging the heads, and/or damaging the media surface, etc., all of which are undesirable. In this respect, the disk cartridge is preferably designed in such a way so as to minimize the possibility of contaminants entering the cartridge. Nonetheless, unless it is sealed, contaminants will eventually enter the cartridge.

In order to reduce the introduction of contaminants into the cartridge, the housing typically includes a door arrangement which closes over the aperture when the disk drive cartridge arrangement is not in use to prevent contamination from entering the housing, such as when the cartridge is removed from the disk drive unit. However, during operation the door arrangement is typically opened to allow the read write heads to access the disk and this may allow contaminants to enter the housing.

In addition, as the disk spins, an air flow is generated by the spinning disk and air flows axially and tangentially over and off of the surface of the spinning disk. This air flow creates an area of low pressure (e.g., a vacuum) proximate a center region of the disk in the area of the disk hub. This low pressure area creates a second flow of air from outside the housing into the disk housing through the space between the hub and the hub opening. This flow of air into the housing through the space around the hub opening may introduce contaminants into the housing.

Therefore, a need exists for air bearing features on magnetic head assemblies for controlling contaminants that may have been introduced into the cartridge from entering the high contact-pressure zone of the head-disk interface.

SUMMARY OF THE INVENTION

According to this invention, an improved head assembly has a first and a second slider for interfacing with a data storage medium of a data storage cartridge. The second slider is preferably disposed below the first slider. The data storage cartridge with which the head assembly of this invention may be employed may be a disk cartridge of the type that can be inserted and ejected from a disk drive. However, the head assembly of this invention may be employed with other types of data storage cartridges. The head assembly may be a magnetic head assembly and be employed with a flexible magnetic data storage media. However, the head assembly of this invention is not so limited and may be employed with other types of data storage media, such as optical media and hard disk media. Moreover, the head assembly of this invention may be employed with a variety of types of disk drives, such as, a scanner disk drive, a camera disk drive, a computer disk drive, and the like. These examples are not intended to be limiting.

According to one embodiment of the present invention, the improved head assembly includes a first and a second slider that each have a pair of longitudinal rails. These rails preferably extend parallel to the longitudinal axis of the respective slider. Both the first and the second sliders have a shaped slot air bearing feature formed in one of their longitudinal rails. The shaped slot air bearing feature in the longitudinal rail of the sliders is preferably an X-shaped slot having an entrance point and an exit point on each side of the rail. In one embodiment, the shaped slot air bearing feature is positioned in a central region of the rail. In an alternative embodiment, the shaped slot air bearing feature is positioned proximate the area containing the sensor. In another embodiment, a plurality of shaped slot air bearing features are formed along the longitudinal length of the rail with at lease one shaped slot air bearing feature positioned in the center region and at least one shaped slot air bearing feature positioned proximate the sensor. The sliders may be disposed in the disk drive such that the longitudinal rails of each of the sliders are aligned. Preferably the longitudinal rail having the shaped slot air bearing feature of each of the sliders is aligned with the longitudinal rail of the other slider that does not have a shaped slot air bearing feature. As described, a storage media may be disposed between the sliders.

In another embodiment of the present invention, a shaped rail air bearing feature is provided on the second rail, or the rail that does not have the sensor. Preferably, the shaped rail air bearing feature includes a L-shaped rail having a longitudinal portion and a transverse portion extending along the leading edge from the longitudinal portion to a free distal end. Preferably, the leading edge of the transverse portion has a shaped leading edge, such as a bevel, a ramp, or a step. An opening is formed between the transverse portion and the first rail. The L-shaped rail creates an area of low pressure behind the transverse portion thereby causing contaminants to flow toward the longitudinal portion of the shaped rail and away from the sensor and the head disk interface.

In another embodiment, the shaped rail air bearing feature can include skives formed at the second rear end of the longitudinal portion to further help control the flow of contaminants and also to provide a good contact with the sensor of the opposed slider.

In another embodiment, the shaped rail air bearing feature can include a ledge formed extending between the distal end of the transverse portion and the longitudinal portion to help control the flow of contaminants by the shaped rail. The height and shape of the ledge can be adjusted based on the application to influence the extent of a sub-ambient pressure zone formed by the shaped rail thereby further controlling the flow of contaminants away from the sensor.

Each of the sliders preferably may have a read/write sensor disposed on an end of at least one of its longitudinal rails. Preferably, the sensor is disposed in the longitudinal rail of the slider that has the shaped slot air bearing feature. Through this sensor the head assembly can communicate information between the data storage media and, for example, a microprocessor. A high contact-pressure zone, or low fly-height zone, is formed within the head disk interface where the sensor communicates with (contacts) the disk. The head disk interface generally includes a whole set of concerns, such as the ABS, shape, contour, slider material, media dynamics, surface parameters, wear characteristics, contaminant control, lubrication, and the like. The high contact-pressure zone, or low fly-height zone, generally includes the portion of the rail where the sensor is located and where the head assembly is contacting the media or flying at its lowest fly-height over the media. In a preferred embodiment, the head assembly is a magnetic head assembly that has an electromagnetic sensor for communicating with a flexible magnetic data storage media.

Each of the sliders preferably has a leading edge and a trailing edge. The leading edge is that which leads the sliders into the direction of rotation of the storage medium, and the trailing edges are that which trail the direction of motion. Preferably, the leading edge has a shape, such as a bevel, a ramp, or a step, and the trailing edges is beveled. The sensor is preferably disposed proximal to the trailing edge of the sliders in the high contact-pressure zone or low fly height zone.

The head assembly of this invention may be disposed on an actuator within a disk drive. In a preferred embodiment of this invention, the head assembly is disposed on a rotary type of actuator, and in an alternative preferred embodiment the head assembly is disposed on a linear type of actuator. The actuator is preferably moveable between a retracted position and an interfacing position. In the retracted position, the head assembly is retracted relative to the area in which the disk cartridge rests within the disk drive when the disk cartridge is inserted into the disk drive. When a disk cartridge is inserted into the disk drive, the actuator may be moved to the interfacing position. In the interfacing position, the head assembly of the actuator is disposed proximal to the storage medium of the disk drive. More particularly, the storage medium may be disposed between the first and the second slider, so that the first slider is disposed proximal to a first surface of the storage medium and the second slider is disposed proximal to a second surface of the storage medium.

The storage medium is preferably rotated as it rests between the first and the second slider. As the storage medium rotates, an air flow (e.g., an air bearing) is created between the first surface of the storage medium and the first slider and the second surface of the storage medium and the second slider. This air flow creates an air bearing between the first surface of the storage medium and the first slider and the second surface of the storage medium and the second slider.

The air bearing features formed in the head assembly of the present invention provide for contaminant control in the flexible media at the sensor location within the high contact-pressure zone or low fly-height zone. The shaped slot and shaped rail air bearing features help direct contaminants away from the sensor, thereby improving the performance of the head assembly. Other advantages described below may also be achieved by controlling contaminant flow in the flexible media away from the sensor.

In a preferred embodiment, the head assembly is a magnetic head assembly that interfaces with a magnetic data storage media. The head assembly may also be used for optical communication with optical data storage media. In addition, the head assembly having air bearing features for controlling a flow of contaminants away from the sensor may be used with flexible, semi-rigid, and rigid media.

Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIGS. 19A, 19B, and 19C show exemplary contaminant flows formed under the head assembly of the present invention having a shaped slot air bearing feature for controlling a flow of contaminants away from the sensor;

FIGS. 20A, 20B, and 20C show another exemplary contaminant flow formed under another head assembly in accordance with the present invention for controlling a flow of contaminants away from the sensor;

FIGS. 21A, 21B, and 21C show another exemplary contaminant flow formed under another head assembly in accordance with the present invention;

FIGS. 23A, 23B, and 23C show another exemplary contaminant flow formed under the head assembly of FIGS. 22A, 22B, and 22C further including skives.

DETAILED DESCRIPTION OF THE PREFERRED EMBODIMENTS

Figure 1:
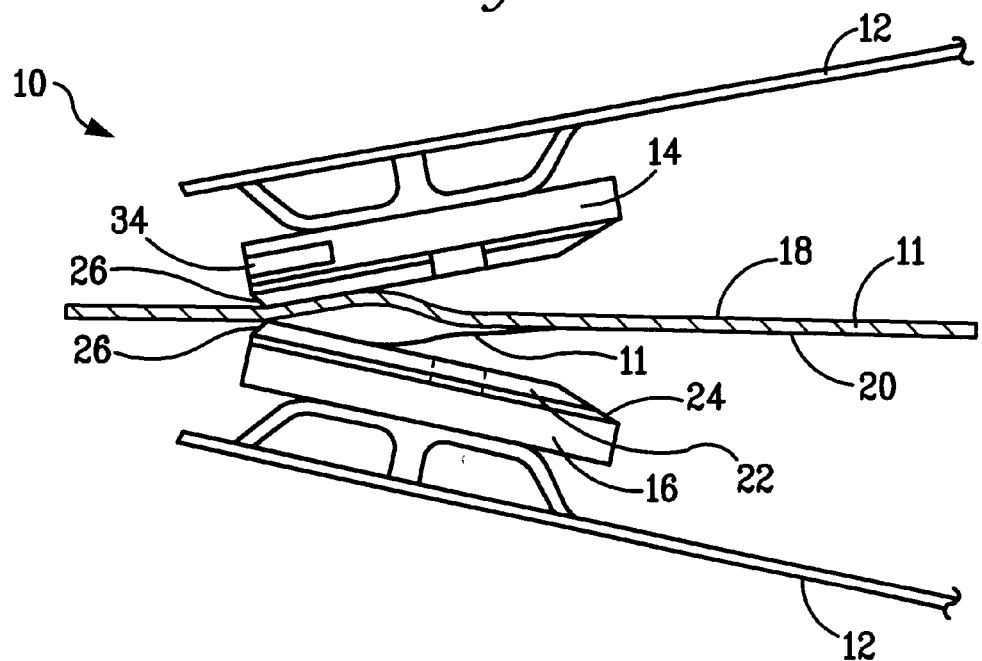
FIG. 1 is a diagrammatical view of the head assembly according to a preferred embodiment of this invention with a storage medium of a disk cartridge.

This invention includes an improved head assembly 10, as shown in FIGS. 1–4, for reading/writing on a data storage medium 11 of a data storage cartridge (not shown). As alluded to above, the improved head assembly 10 of this invention may be used with a variety of types of data storage media, such as magnetic media and optical media. An exemplary data storage cartridge that has a data storage medium 11 is shown in commonly assigned U.S. Pat. No. 5,650,891 entitled "Apparatus For Performing Multiple Functions In A Data Storage Device Using A Single Electro-Mechanical Device," which is hereby incorporated by reference. Even more specifically, the head assembly of this invention may be employed with a magnetic media, such as the Zip® disk cartridge. This invention is directed toward providing enhanced electrical communication with relatively high density media, such as the Zip® disk cartridge or similar storage media. With the development of media having a density greater than that of the Zip® 100 disk cartridge, improved read/writing devices are needed. The head assembly of this invention also provides improved electrical communication with media having a density that is higher than that of the Zip® 100 disk cartridge. In the embodiments described below, the head assembly is described as a magnetic head assembly that is employed with magnetic storage media. However, it should be understood that the head assembly of this invention can be employed with other types of media, such as optical media.

In a preferred embodiment, the disk drive with which the head assembly 10 of this invention may be employed may be of one of a variety of types, including but not limited to a stand alone disk drive, a personal computer disk drive, a portable personal computer disk drive, such as in a laptop computer disk drive or a notebook type of computer disk drive, a scanner disk drive, a camera disk drive and a hand held type of computer disk drive. For example, the magnetic head assembly of this invention may be employed with the disk drive described in U.S. Pat. No. 5,650,891.

By way of background, the disk drive with which the head assembly 10 of this invention may be employed may have a disk drive motor for operating the disk cartridge, such as, but not limited to, the one shown in U.S. Pat. No. 5,650,891. In this type of disk drive, the disk drive motor is a spindle motor that is disposed in the chassis of the disk drive. When the disk cartridge is inserted into the disk drive, the disk drive motor engages the hub of the disk cartridge. When engaged with the hub of the disk cartridge, the disk drive motor is operated by a microprocessor to rotate the hub and the attached storage medium 11.

Neither the disk drive nor the disk cartridge described above are part of this invention. However, they may be used in combination with the magnetic head assembly 10 of this invention, which is described in detail below.

The head assembly 10 of this invention may be disposed on an actuator 12 within the disk drive. The actuator 12 depicted in FIG. 1 may a linear type of actuator as disclosed in U.S. Pat. No. 5,650,891. Alternatively, the actuator 12 may be a rotary type of actuator as shown in commonly assigned U.S. Pat. No. 5,636,085, entitled "Magnetic Read/Write Head Assembly Configuration With Bleed Slots Passing Through Rails to Stabilize Flexible Medium While Attaining Low Fly Heights With Respect Thereto," which is hereby incorporated by reference.

The head assembly 10 of this invention may include a first slider 14 and a second slider 16. When the actuator is in the interfacing position described below, the data storage medium 11 may be disposed between the first 14 and the second slider 16, as shown in FIG. 1. In this position, the first slider 14 may be disposed proximal to the first surface 18 of the storage medium 11, and the second slider 16 may be disposed proximal to the second surface 20 of the storage medium 11. As shown, the first slider 14 is disposed above the storage media and the second slider 16 is disposed beneath the storage media. However, the invention is not so limited. The first slider 14 and the second slider 16 need not be disposed on opposing sides of the media and also, they need not be disposed above and below each other depending, for example, upon the orientation of the media.

Figure 2:
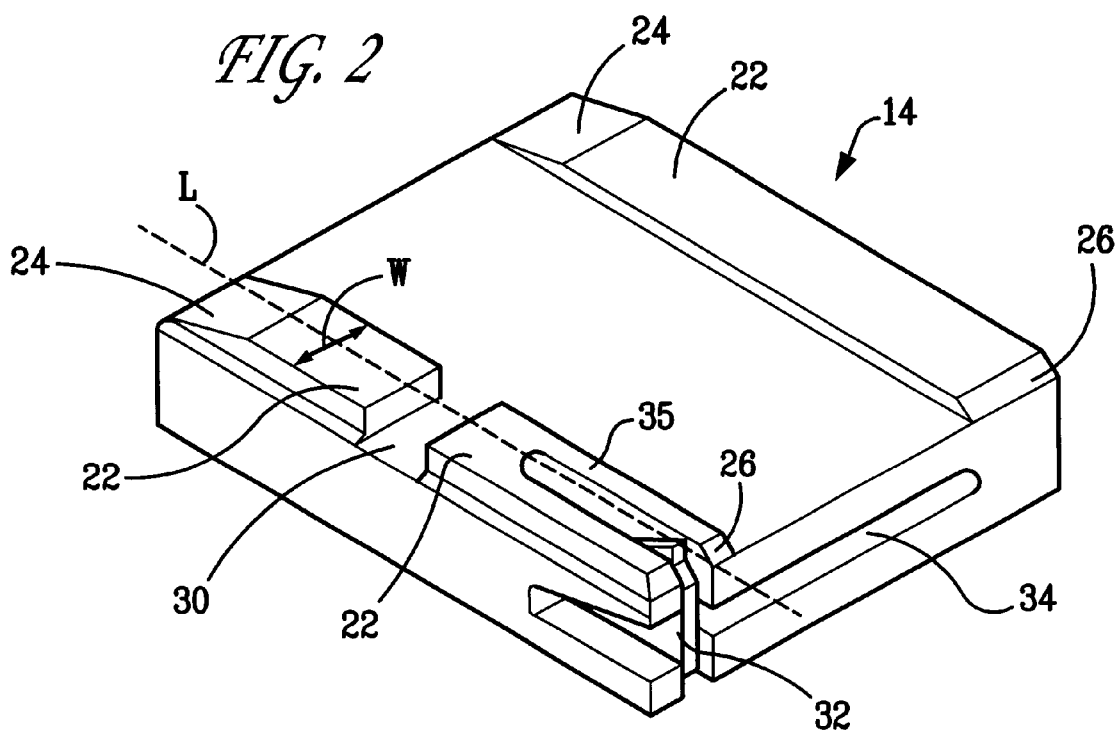
FIG. 2 is an isometric view of a portion of the head assembly of FIG. 1.
Figure 3:
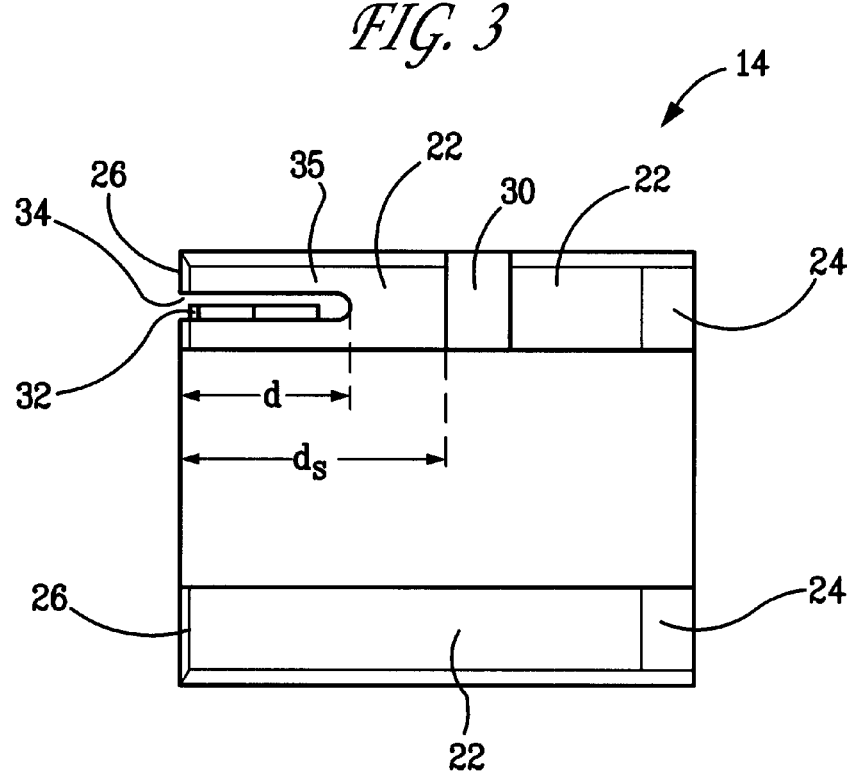
FIG. 3 is a top view of the portion of the head assembly of FIG. 2.

Both the first slider 14 and the second slider 16 have a pair of longitudinal rails 22, as best shown in FIGS. 2 and 3. Although only the first slider 14 is shown in FIGS. 2 and 3, it will be appreciated that the second slider 16 is the same as the first slider 14. The following discussion of the first slider 14 applies to the second slider 16. The longitudinal rails 22 of each of the sliders 14, 16 may extend the length of each of the respective sliders. Each of the rails 22 has a first longitudinal end 24 and a second longitudinal end 26. Preferably, the first longitudinal end 24 has a shaped leading edge, such as, for example, a bevel, a ramp, or a step, and the second longitudinal end 26 of the rails 22 may be beveled. However, the ends 24,26 need not be shaped or beveled. The first longitudinal end 24 of each of the rails 22 may be the leading edge of the rails 22, and the second longitudinal end 26 of each of the rails 22 may be the trailing edge of each of the rails 22. The trailing edge is that which trails the direction of motion of the slider relative to the storage medium 11, and the leading edge is that which leads the direction of motion of the slider relative to the storage medium 11. Each rail of the first slider 14 and the second slider 16 has a width W that extends transversely to the longitudinal L axis of each of the rails, as shown in FIG. 2.

Figure 4:
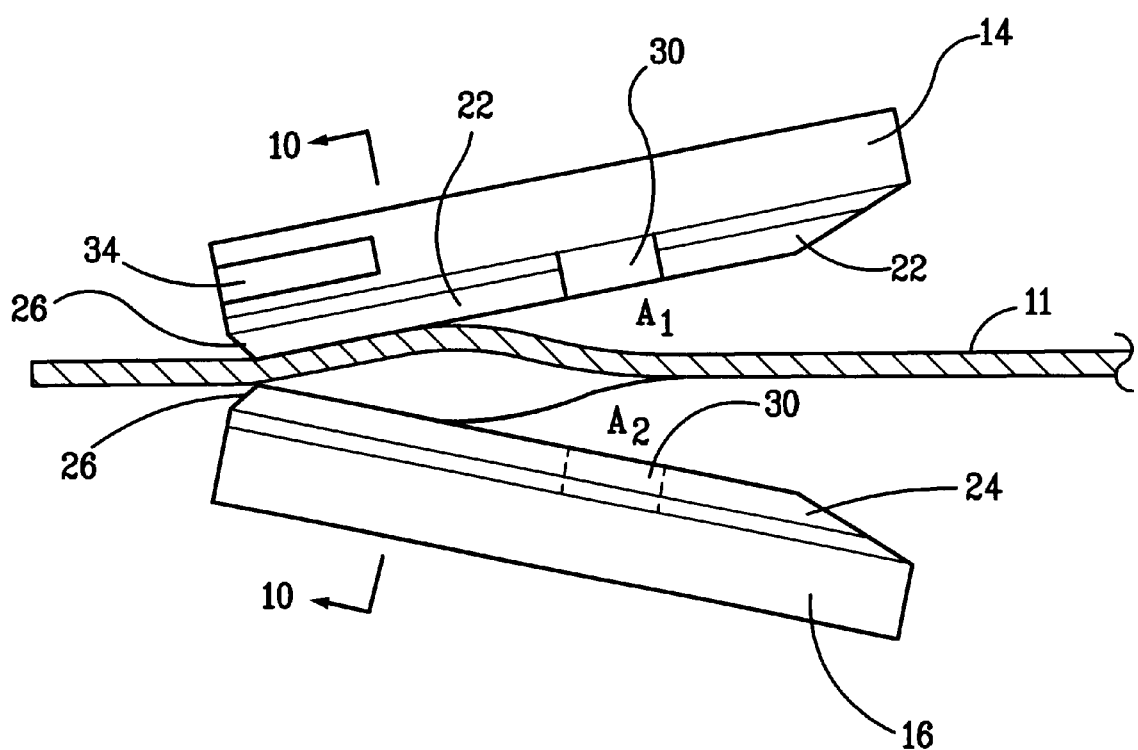
FIG. 4 is a diagrammatical view of the operation of the head assembly of FIG. 1.
Figure 5:
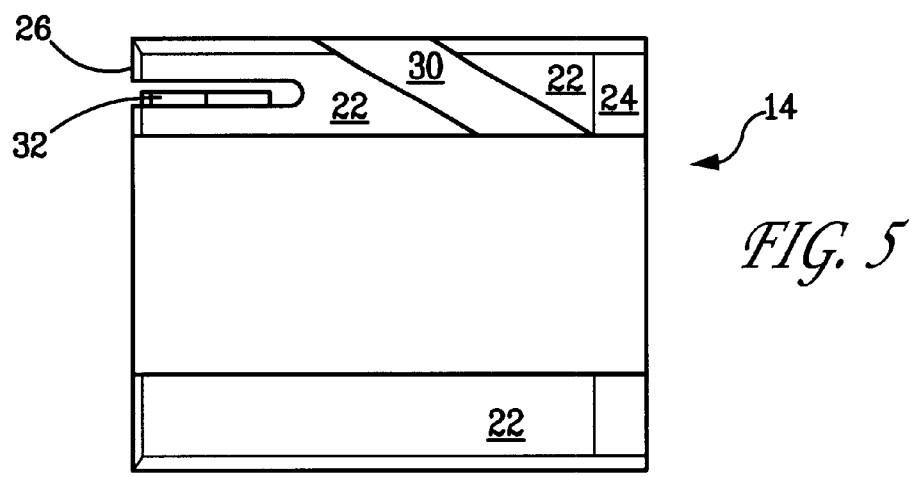
FIG. 5 is a top view of another preferred embodiment of the head assembly of FIG. 1.
Figure 6:
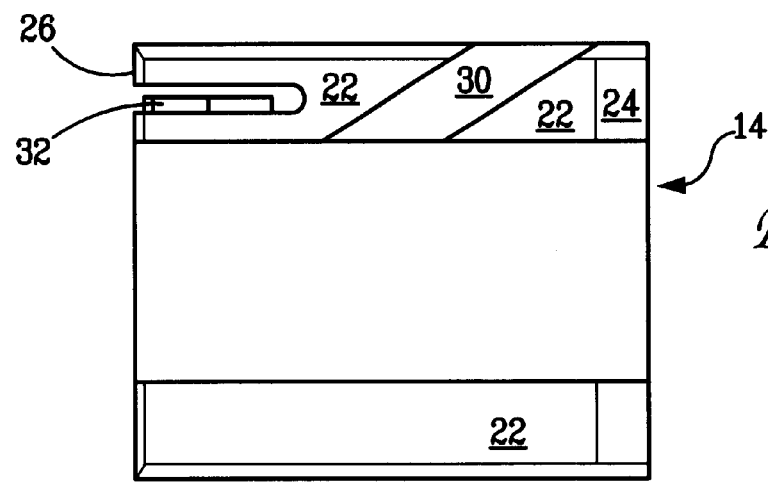
FIG. 6 is a top view of another preferred embodiment of the head assembly of FIG. 1.

Both the first and the second slider 14, 16 of the head assembly 10 have a slot 30 disposed in one of their longitudinal rails 22. When assembled to the actuator as shown in FIG. 1, the first slider 14 is disposed above the second slider 16. Preferably, the sliders are gram-loaded toward each other when assembled to the actuator. The sliders 14, 16 may be assembled to the actuator with any of a variety of fastening techniques and may be mounted to a flexibly mounted suspension arm of the actuator. When mounted to the actuator the slotted rail of the first slider 14 is disposed above the longitudinal rail of the second slider 16 that does not have the slot, as shown in FIGS. 1 and 4. Similarly, the slotted longitudinal rail of the second slider 16 is disposed beneath the longitudinal rail of the first slider 14 that does not have a slot 30. This is also understood with reference to FIG. 2, where it can be imagined that the slider of FIG. 2 is mounted as shown in FIG. 1 as both the first slider 14 and the second slider 16.

Figure 8:
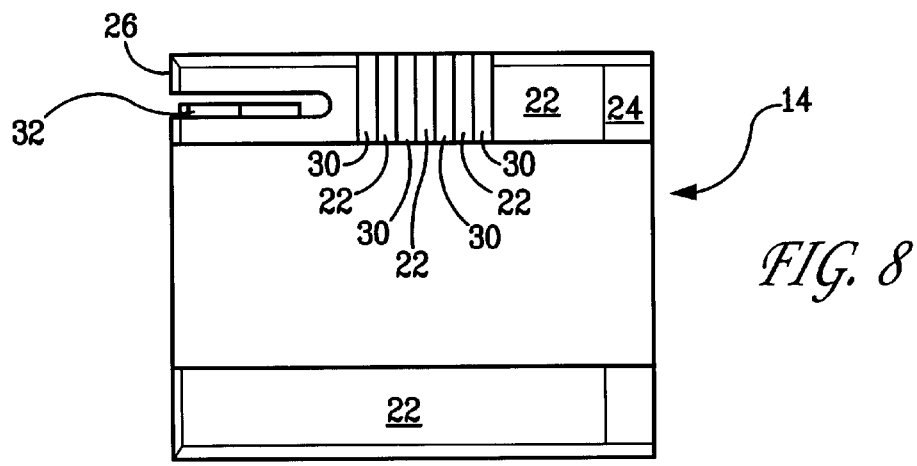
FIG. 8 is a top view of another preferred embodiment of the head assembly of this invention.
Figure 9:
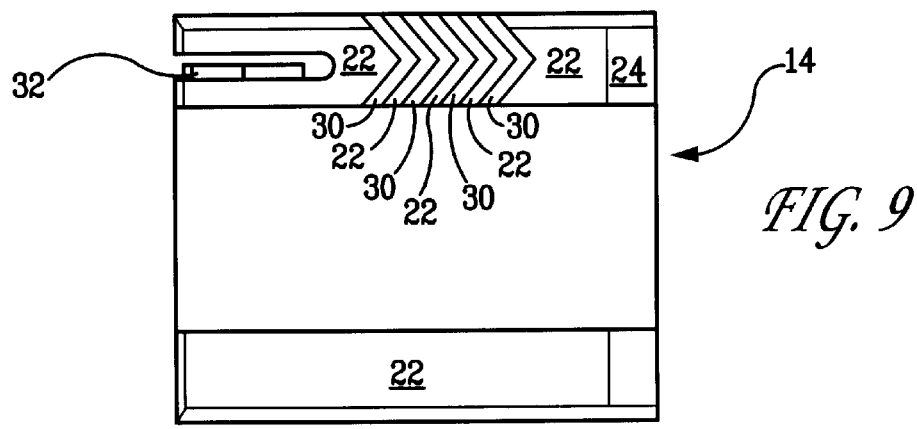
FIG. 9 is a top view of another preferred embodiment of the head assembly of this invention.

Preferably, the slots 30 are disposed transverse to the longitudinal axis L of the rails 22. Even more preferably the slots 30 are disposed across the width W of one of the rails 22. The slot 30 in the first slider 14 is preferably similar to the slot 30 in the second slider 16. The slots 30 may have a variety of shapes and may be disposed at an angle relative to the longitudinal axis of the rails 22, as shown in FIGS. 5, 6, 8 and 9. In each of the embodiments shown, the slot 30 of the second slider 16 would match the slot 30 of the first slider 14, and the slots 30 are aligned with a longitudinal rail of the other slider that does not have a slot, which is preferred where flexible media is used. The slot may be defined by a series of slots as shown in FIG. 8. As shown in FIG. 9, the slots may be chevron shaped. Any number of slots may be employed, so long as they are transverse to the longitudinal axis of the respective rails. As described in further detail below, one of the functions of this slot 30 is to facilitate the deflection of the storage medium 11 of the disk cartridge.

Figure 7:
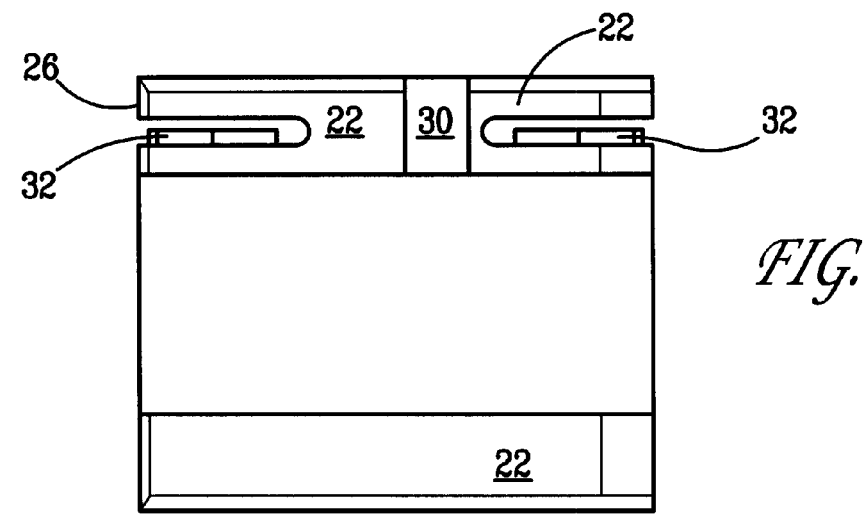
FIG. 7 is a top view of another preferred embodiment of the head assembly of FIG. 1.

Preferably, each of the rails 22 of the sliders 14, 16 has a sensor 32. As shown for composite type sliders, a slot 34 can be formed in and beneath one of the rails 22 for receiving a wire (not shown) for electrically communicating with the sliders 14, 16. This wire may be in electrical communication with a microprocessor, so that the storage medium 11 can electrically communicate through the sliders 14, 16 to the microprocessor. Through this wire the respective slider couples the storage media to the microprocessor. The slot 34 may extend longitudinally into one of the rails, as shown in FIGS. 2 and 3. In a preferred embodiment of this invention, the slot 34 is in the rails 22 of the sliders 14, 16 that have the slot 30. Even more preferably, the slot 34 extends longitudinally from the trailing edge 26 of the longitudinal rail 22 that has the slot 30 and extends into the longitudinal rail a distance d that is less than the distance $d_s$ from the trailing edge 26 to the slot 30, as shown in FIG. 3. In an alternative preferred embodiment, the first slider 14 has a slot 34 and a wire in both ends of the longitudinal rail 22 that has the slot 30, as shown in FIG. 7. In this embodiment, one of the slots and wires provide a high density core and the other provides a low density core. Preferably, the low density core leads the direction of motion and the high density core trails the direction of motion of the media. Similar to the first slider 14, the second slider 16 may also have a slot 34 and a wire and the second slider 16 may have any of these embodiments shown in FIGS. 5–9, so long as it matches the embodiment of the first slider 14. However, a slot 34 is not required, and other suitable techniques may be used to attach or form the sensor on the head assembly.

Figure 10:
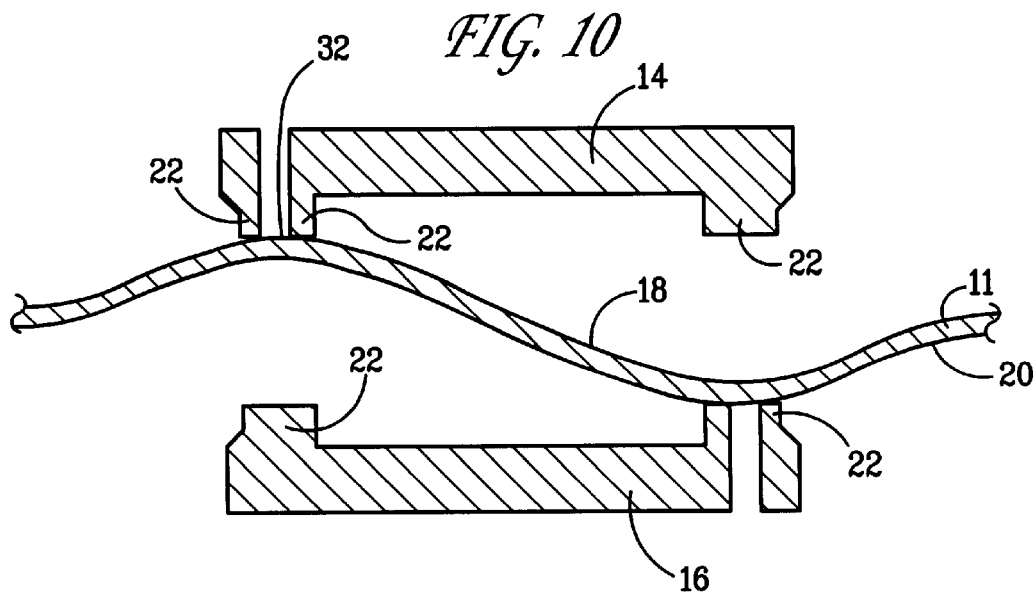
FIG. 10 is a cross section taken along line 10—10 of FIG. 4.

FIGS. 1, 4 and 10 depict the operation of the head assembly 10 of this invention. As shown, in the interfacing position the storage medium 11 of the disk drive is disposed between the first and the second slider 14, 16. The first slider 14 is disposed proximal to the first or top surface 18 of the storage medium, and the second slider 16 is disposed proximal to the second or bottom surface 20 of the storage medium 11. In operation, the storage medium 11 is rotated by a disk drive spindle motor or the like. The direction of rotation of the storage medium 11 is into the leading edges 24 of the sliders 14, 16. While rotating, an air bearing is created in between each of the sliders 14, 16 and the storage medium 11. Because of the slot 30 in one of the rails 22, of each of the sliders 14, 16 some of the pressurized air between the first slider 14 and the storage medium 11 and the second slider 16 and the storage medium bleeds through the slots 30. This creates an area $A_1$ of low pressure, in the region proximal to the slot 30 in the first slider 14 and an area of low pressure $A_2$ in the region that is proximal to the slot in the second slider 16. Because of these areas of low pressure, the storage medium 11 deflects substantially as shown in FIGS. 1, 4 and 10 toward the trailing edges 26 of the slotted rail of each of sliders 14, 16. It will be appreciated that the storage medium deflects upwards toward the slot 30 in the first or upper slider 14 and downward toward the slot 30 in the second or bottom slider 16, as best shown in FIG. 10. This deflection occurs from the slot 30 in the respective slider to the trailing edge of the respective slider. As shown in FIGS. 4 and 10, the storage medium deflects in a ripple or wave shape since it is deflecting both upward and downward.

By deflecting the storage medium 11 toward the trailing edges 26 of the first and the second slider 14, 16, the performance of the head assembly 10 is improved. In particular, since the storage medium 11 deflects toward the sensors 32 in the slotted rails, the performance of the head assembly 10, will be improved.

In a preferred embodiment of this invention, the first and the second slider 14, 16 have the following dimensions.

However, these dimensions are provided by way of example and not by way of limitation. These dimensions are for a "nano" slider. However, this invention may be employed with sliders of a variety of sizes, including but not limited to, standard, micro, pico, and femto sliders.

Width of sliders=0.060+/−0.01 inch

Length of sliders=0.078+/−0.004 inch

Width of rails=0.012+/−0.004 inch

Length of slot=0.010+/−0.005 inch

Thickness=0.018+/−0.002 inch

With the head assembly of this invention, the media deflects so that the trailing edge of the slotted longitudinal rail of each slider actually touches the media. Since the media is relatively flexible, such as that used in the ZIP® disk cartridge, the media can deflect. Since the coatings on the media are relatively durable, they can withstand the contact between the sliders and the media. This contact or closeness between the media and the sensors enhances the electrical communication between the media and the slider. As is generally understood, the voltage or strength of the electrical signal between the slider and the media is dependent upon the spacing between the media and the sensor. The strength of the signal decreases in an exponential relationship with the spacing between the media and the sensor. (This is generally known as part of the Wallace equation: voltage is proportional to $e^{-2\pi(spacing)/wave\ length}$). Thus, with the media dragging on the rails that have the sensors, the electrical signal is enhanced between the media and the sensor. This is particularly important for magnetic heads that interface with improved magnetic media that have a relative high density and more storage capacity, for example magnetic media that have more storage capacity than, for example, the ZIP® 100 disk cartridge. As described in further detail below, the head assembly of this invention enhances communication with data storage media, such as, for example, the ZIP® 250 disk cartridge.

This invention is also significant in enhancing communication with media that are rotated at higher velocities. An increase in velocity has three main effects of interest to this discussion. First, the slider typically flies higher than it does at lower velocities. Second, there is an increase in energy associated with disk vibrations as the disk rotation speeds are increased. The third effect requires some introduction. Flexible media disk drives typically have a "compliance zone" which defines the range of geometric tolerances for the parts involved in the positioning of the heads relative to the media over which communication of sufficient quality is maintained between the heads and the media. These tolerances add up to variations in penetration, pitch and roll. The sensitivity of the Zip® 100 drive to these variations is known to increase (signal losses increase) with increasing disk rotation speed. Thus, the third effect is that the disk becomes less compliant with increasing rotation speed. It is desired to increase the speed of rotation of the media to increase the data transmission rate between the media and the sensor. This invention permits increased speeds of rotation of the media by providing contact between the media and the head where the sensor is disposed. This contact ensures that the sensor will remain in communication with the media at higher speeds and thereby permit higher data transmission rates, than, for example, the Zips® 100 disk drive.

Magnetic head assemblies, such as that shown in the Jones et al. patent, have transverse slotted longitudinal rails in each slider that are aligned with transverse slotted longitudinal rails in the other slider. Because of this, when the storage media is employed with the head assembly taught by Jones et al., the media will not preferentially deflect toward the sensor in each slider. Rather, because the slots are aligned in Jones et al., an imbalance of forces is not created and the media is not deflected as taught by the head assembly of this invention. As discussed in the Jones et al. patent, the magnetic head assembly taught by Jones et al. provides relatively low fly heights. However, with the development of higher capacity storage media, the fly height taught by Jones et al. is insufficient and does not create the required electrical connection between the media and the sliders. With the invention taught by Jones et al., fly heights on the order of about 2 to 5 micro inches were achieved and acceptable for its intended use. Higher density media require fly heights that are in the range of about 0 to 3 micro inches. The magnetic head assembly of this invention addresses this need and results in even lower fly heights than that taught by Jones et al. and even causes the sliders to drag on the media. This dragging or contact between the media and the slider causes the enhanced communication between the sensor and the media.

White et al. disclose a head assembly that has a slider that has a series of longitudinal slots in a rail aligned with a slider that has an unslotted rail. Because the slots of White et al. are longitudinal, the media will not preferentially deflect toward the sensor as the media does when used with the sliders of this invention. Rather, the media when used with the sliders of White et al. will deflect along the entire length of the rails. This results in more bending of the media and does not achieve the dragging and contact between the sliders and the media that is achieved with this invention. The transverse slots of this invention ensure that the media will deflect toward the sensor and achieve contact between the sensor and the media. It is contact in this area that is desired in order to achieve enhanced communication between the media and the sensor.

In order to manufacture the longitudinal rails of White et al., the width of the rails and the slider must be relatively much wider than the rails of this invention. Because of the increased width of the rails in White et al., the media will have relatively sharp bends when it is disposed between the sliders in the area that is between the rails. These sharp bends are more difficult to impose on the media, and therefore the media does not respond and deflect as much as it could because it resists bending to form the sharp bends. The transverse slots of this invention do not require as great a width of the rail and therefore, do not result in these relatively sharp bends in the media. Thus, the bending of the media is more easily achieved with this invention.

Figure 11:
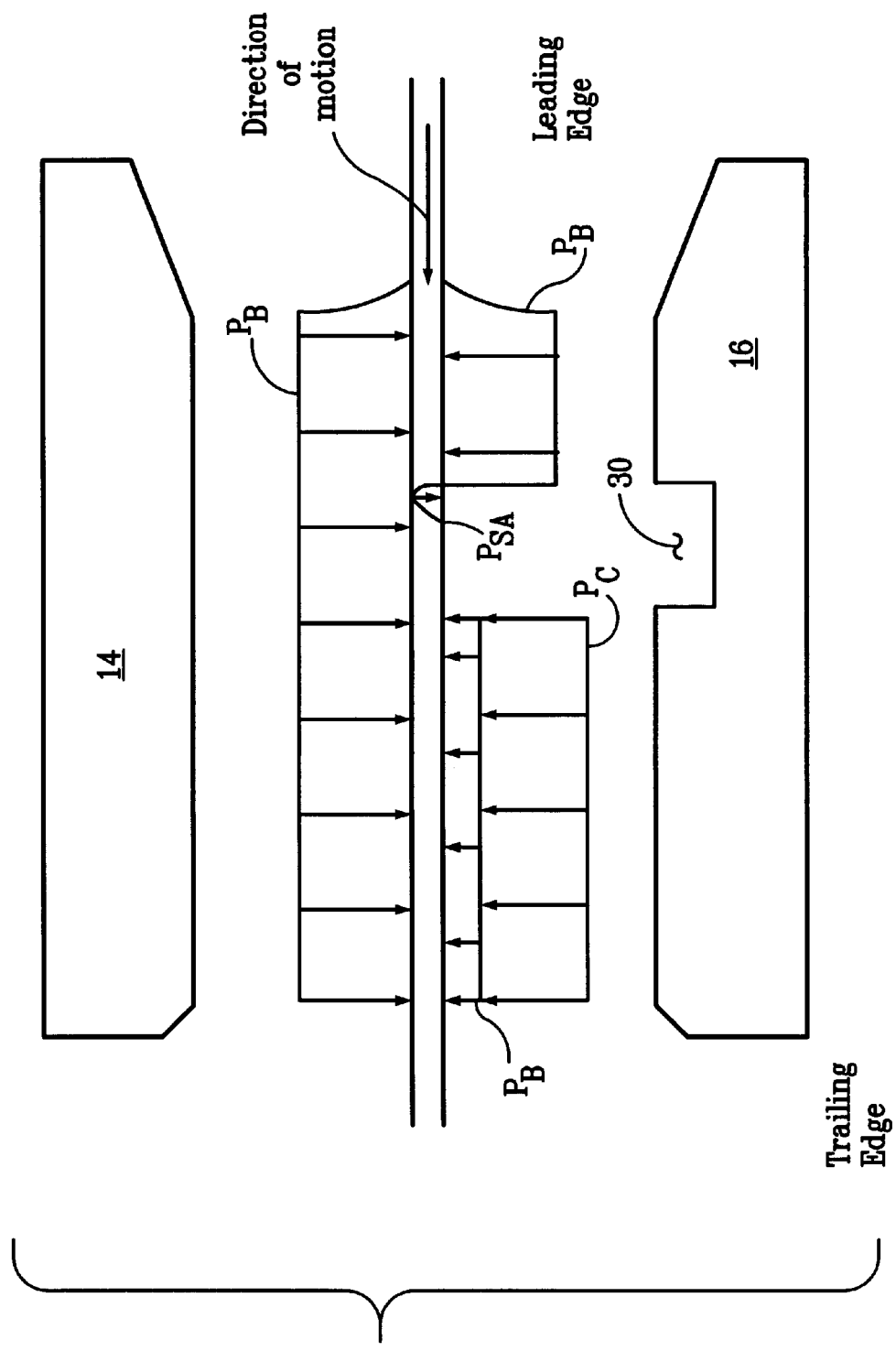
FIG. 11 is a diagram illustrating the operation of the head assembly of FIG. 1.

In order to further understand the operation of this invention, a schematic force diagram is provided in FIG. 11. FIG. 11 illustrates the operation of the media with the transverse slot in the second slider 16. Although the media 11 is shown non-deflected in FIG. 11 for purposes of explaining the invention, it should be understood that the media deflects as shown in FIGS. 1, 4 and 10 in operation. It should be understood that the media will react similarly to the slot in the first slider 14, except that the pressures will be reversed in direction, so as to correspond to the surfaces of the rails. As is generally understood, the sliders are pre-loaded or gram-loaded toward the magnetic media. This gram loading causes a biasing toward the media. The rotation of the storage media combined with this gram loading creates an air bearing between the storage media and the sliders. A contact pressure is also created as the media rotates and contacts the slider.

As shown in FIG. 11, the air bearing pressure $P_B$ on each side of the media sharply increases as the media is disposed between the beveled leading edges 24 of the rails 22. The beveled edges create this sharp increase. Since the rails 22 are similar until the slot is reached, the media will not deflect or deflect insignificantly up or down as the media travels between the rails until the slot 30 is reached. Upon reaching the slot 30, the air pressure from the slotted portion of the rail becomes sub-ambient $P_{SA}$ and then essentially zero. Because the rail of the top slider does not have a slot, it still imposes an air bearing pressure downward onto the media. This unmatched downward pressure accelerates the media downward toward the slot 30. When the slot ends, air pressure is again exerted by the rail in the lower slider, but at a lesser magnitude than the air pressure exerted by the upper rail. Because the media contacts, the second or bottom slider a contact pressure $P_C$ is exerted upward on the media. This contact pressure combines with the air pressure $P_B$ exerted by the lower slider to balance the air pressure exerted by the top slider. The slotted rail in the first or top slider 14 operates similarly.

In summary, since the transverse slot in each rail is not aligned with a slotted rail, the air bearing on the surface of the media near the slotted rail is disrupted or destroyed. This imparts momentum to the media to deflect toward the rail with the slot and closer to the sensor. This also causes lower flying heights and contact between the media and the slider where it is desired, at the location of the sensor. This enhances the electrical signal between the media and the slider and enables higher density media to be used.

When the media is spun, the media wrinkles and vibrates. The surface of the media does not remain flat because it is a flexible media. By deflecting the media toward the sensor and creating a contact pressure between the media and the sensor, the media is flattened proximal to the sensor. This enhances the communication between the media and the sensor. This should be compared to the heads taught by Jones et al. which provide no preference for deflecting the media toward the sensor.

The head assembly of this invention can also be employed with optical media and optical sensors such as near field optical sensors and far-field optical sensors.

Figure 12:
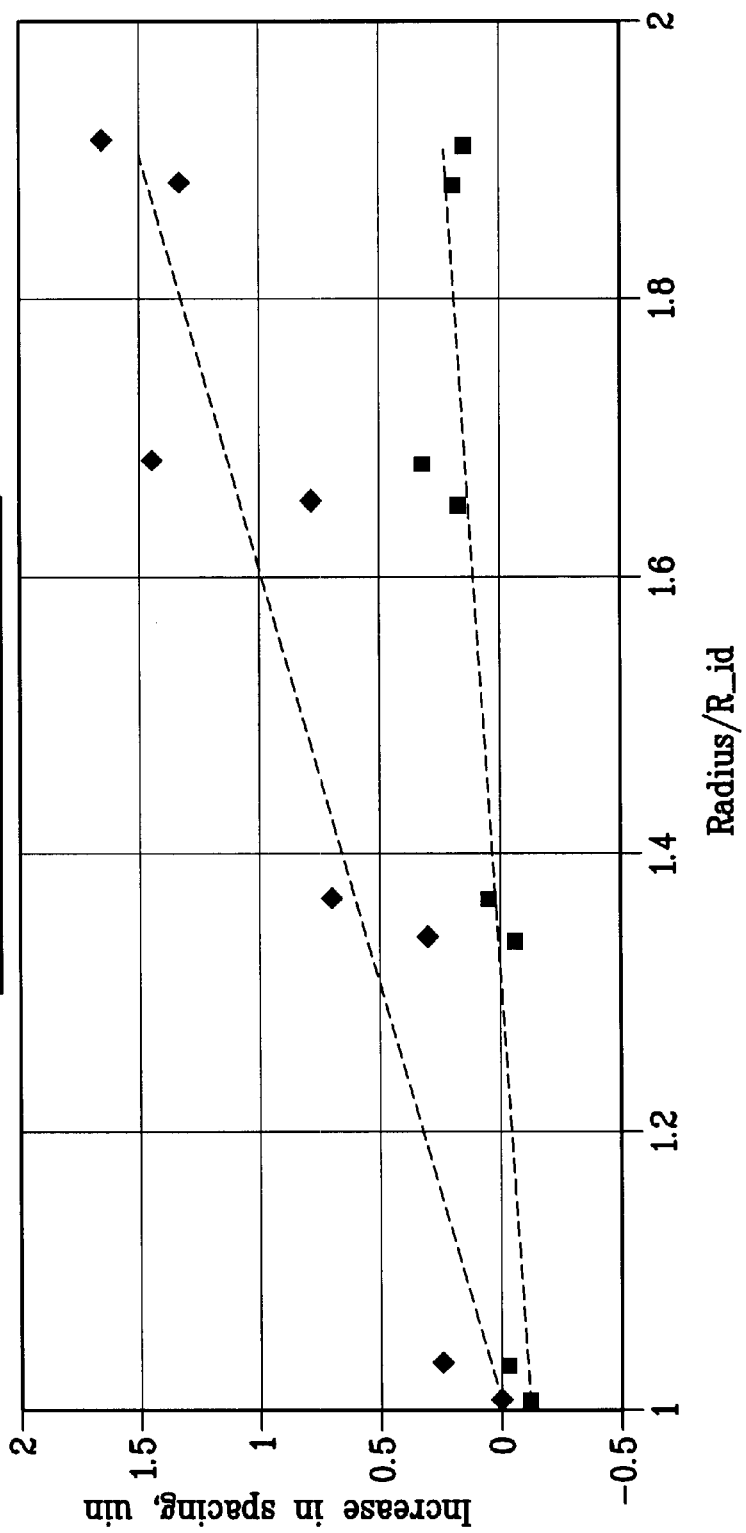
FIG. 12 is a graph comparing the operation of the head assembly of this invention with a prior art head assembly.

The operation of the head assembly can also be understood with reference to FIG. 12. FIG. 12 is a graphical representation of the performance of the heads used in a ZIP® disk drive with the heads of this invention. The graph depicts the results of tests performed on these heads. The vertical axis is the increased spacing or distance between the media and the slider where the sensor is disposed as the sliders move from the center of the media. The horizontal axis is a ratio of the radius of the location of the sensor on the media to the radius from the center of the media to the inner most track on the media. The diamond points represent the spacing between the heads of Jones et al. or the ZIP® 100 disk drive, for example, at various points along the media, and the squares represent the data points obtained with the heads of this invention.

As shown, as one moves to the right on the page or toward the outer part of the disk, the spacing between the sensor and the media increases. This degrades the communication between the media and the sensor and limits the speed of rotation of the media, which limits the data transmission rate. In comparison, the heads of this invention result in a relatively constant spacing. This permits increased rotation of the media and increased data transmission rates.

In summary, the improved head assembly 10 of this invention includes a first and a second slider 14, 16. Both of these sliders 14, 16 have a pair of longitudinal rails 22, and a slot 30 disposed in one of the longitudinal rails 22.

Preferably, the sensor 32 is disposed in the slotted longitudinal rails 22, and even more preferably the sensors 32 are disposed proximal to the trailing edge 26 of each slotted longitudinal rail 22. The storage medium 11 of a disk cartridge may be disposed between the first and the second sliders 14, 16. While rotating between the first and the second sliders 14, 16, an air bearing is created between the surfaces 18, 20 of the storage medium 11 and the respective slider 14, 16. Air bleeds from the slots 30 in the rails 22. This causes the pressure on the respective surfaces of the media that are proximal to the slots 30, to be less than the pressure on the opposing side of the media. Because of the reduced pressure, storage medium 11 deflects toward the slots 30 and the sensors, as shown in FIGS. 4 and 10 in a wave pattern. This enhances the performance of the head assembly 10, and potentially has the other advantages described above.

This invention includes an improved head assembly having air bearing features for contaminant control in flexible, semi-rigid, and rigid media at the sensor within the high contact-pressure zone thereby improving certain features of the head-disk interface (HDI). The sensor 32 communicates information or data between the data storage medium 11 and the disk drive. The sensor 32 is located in a high contact-pressure zone 35 of the head assembly. The high contact-pressure zone 35 is generally defined as the area of the rail from the cross slot or air bearing feature to the trailing edge and is where the sensor communicates (e.g., contacts the medium or has it lowest fly-height over the medium). The head assembly, described herein above, having a single cross-slot helped to keep and maintain the high contact-pressure zone by controlling the flying characteristics of the head over the medium. The present invention includes an improved head assembly having air bearing features that allow the head to keep contaminants out of the high contact-pressure zone 35 and away from the sensor 32.

The present invention can include one or more air bearing features 50a, 50b formed on one or both of the longitudinal rails 22 of the sliders 14, 16. The head assembly of the present invention includes air bearing features that direct the flow of contaminants away from the high contact-pressure zone 35 and therefore, away from the sensor 32. This helps to prevent problems associated with head spacing, such as phantom writes, and also damage to the head, the disk, or both.

Each slider 14, 16 can be formed having one or more air bearing features comprising a shaped channel or slot air bearing feature 50a formed in the longitudinal rail 22 in which the sensor 32 is mounted for directing contaminants 51 away from the sensor 32 and the high contact-pressure zone 35, and/or a shaped rail air bearing feature 50b as the rail not having the sensor. The shaped slot air bearing feature 50a can be formed in place of the cross-slot 30, or alternatively, each slider can have both a cross-slot 30 to help the flying characteristics and an air bearing feature 50a for contaminant control in flexible media at the sensor. In addition, the present invention can also include an additional shaped slot air bearing feature 50a added to the rail 22 having the sensor 32 and positioned by the sensor 32. In another embodiment of the present invention, an alternative air bearing feature 50b can include a head assembly having a shaped rail 22a air bearing feature for controlling a flow of contaminants 51 from entering the high contact-pressure zone and away from the sensor 32. The shaped rail 22a can include skives 52 formed proximate the tailing edge of the shaped rail 22a for further improving head performance. A ledge 53 can be provided on the shaped rail 22a to further control the flow of contaminants 51 over the flexible media 11 and away from the sensor 32.

Both the first and the second slider 14, 16 of the head assembly have an air bearing feature 50a, 50b disposed on one of the longitudinal rails 22. When assembled to the actuator as shown in FIG. 1, the first slider 14 is disposed above the second slider 16. When mounted to the actuator the rail having air bearing features of the first slider 14 is disposed above the longitudinal rail of the second slider 16 that does not have the air bearing features, similar to those shown in FIGS. 1 and 4. Similarly, the longitudinal rail having air bearing features of the second slider 16 is disposed beneath the longitudinal rail of the first slider 14 that does not have air bearing features. This is also understood with reference to FIGS. 13–18, where it can be imagined that the slider of these Figures is mounted in a similar manner as shown in FIG. 1 as both the first slider 14 and the second slider 16.

Figure 13:
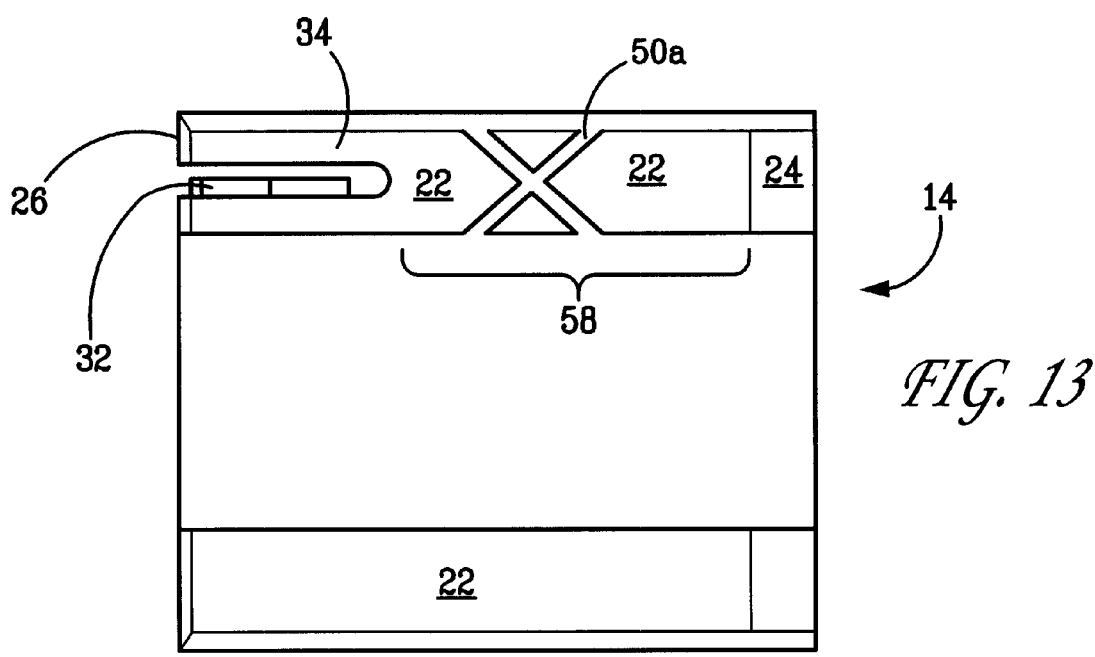
FIG. 13 is a top view of another embodiment of the head assembly of FIG. 1 having a shaped slot air bearing feature.

Preferably, the air bearing feature 50a is formed on the longitudinal rail 22 having the sensor 32. As shown in FIG. 13, in one embodiment, the shaped slot air bearing feature 50a can be formed in the rail 22 proximate a center region 58 of the rail 22. The center region 58 is between the shaped first longitudinal end 24 and the sensor 32. For example, the shaped slot 50a is preferably positioned a distance $d_s$ from the second longitudinal end 26 of the trailing edge which is greater than a distance d from the trailing edge, as can be appreciated by referring to FIG. 3.

As shown in FIG. 13, the shaped slot air bearing feature 50a preferably includes an X-shaped slot that extends across the entire width W of the rail 22. Preferably, the X-shaped air bearing feature 50a is formed as a channel or slot in rail 22 having a predetermined depth thereby allowing a cross-flow of contaminants from one side of the rail to the other across the width W of the rail. This is important in that the direction of flow of contaminants through the air bearing feature depends in part on the skew of the head assembly as it travels over the flexible media. As can be appreciated in the art, for a rotary type actuator application the skew of the head assembly changes with the position of the head assembly as it travels over the flexible media from the inner diameter to the outer diameter of the disk shaped media. The X-shape provides for improved contaminant control because it has angled entrance and exit points on both sides of the rail 22. This accounts for variations in skew of the head assembly between the inner diameter and the outer diameter and provides for smoother flow paths for contaminants and helps direct contaminants away from the high contact-pressure zone and the sensor 32. The X-shaped air bearing feature is also applicable to applications having linear type actuators.

Figure 14:
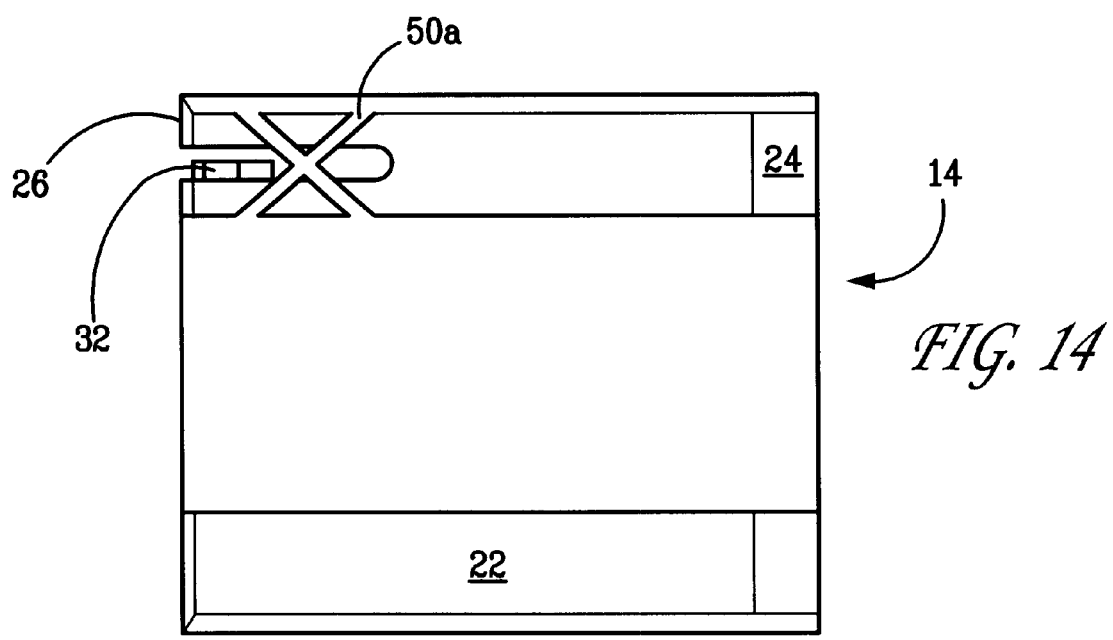
FIG. 14 is a top view of another embodiment of the head assembly of FIG. 1 having a shaped slot air bearing feature formed proximate the sensor.
Figure 15:
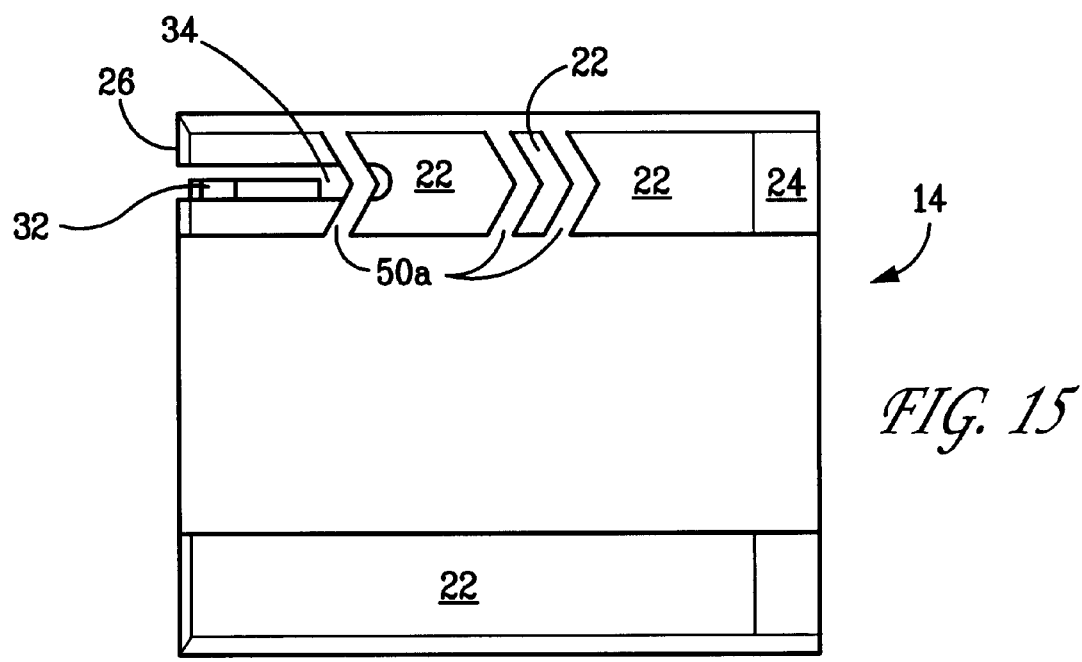
FIG. 15 is a top view of another embodiment of the head assembly of FIG. 1 having a plurality of shaped slot air bearing features formed both on the rail and by the sensor.

FIG. 14 shows another embodiment in accordance with the present invention wherein the air bearing feature 50a is formed proximate the sensor 32. As shown in FIG. 14, the shaped slot air bearing feature 50a can be located in the high contact-pressure zone. In another embodiment shown in FIG. 15, the air bearing feature can include a plurality of shaped slot air bearing features 50a formed along the longitudinal length of the rail 22 having the sensor 32. As shown in FIG. 15, one or more shaped slot air bearing features 50a can be formed in the rail a distance $d_s$, from the trailing edge 26 which is greater than a distance d from the trailing edge 26 in which the slot 34 is formed and another air bearing feature 50a can be formed proximate the sensor within the distance d from the trailing edge. This provides desired fly characteristics and also desired contaminant control within the high contact-pressure zone and at the sensor 32. The performance and operating characteristics of the air bearing features 50a of FIGS. 13, 14, and 15 can be changed/modified depending on the particular application by using alternative shapes or by varying the dimensions of the air bearing feature 50a, such as the length, the width, the depth, etc.

Figure 16:
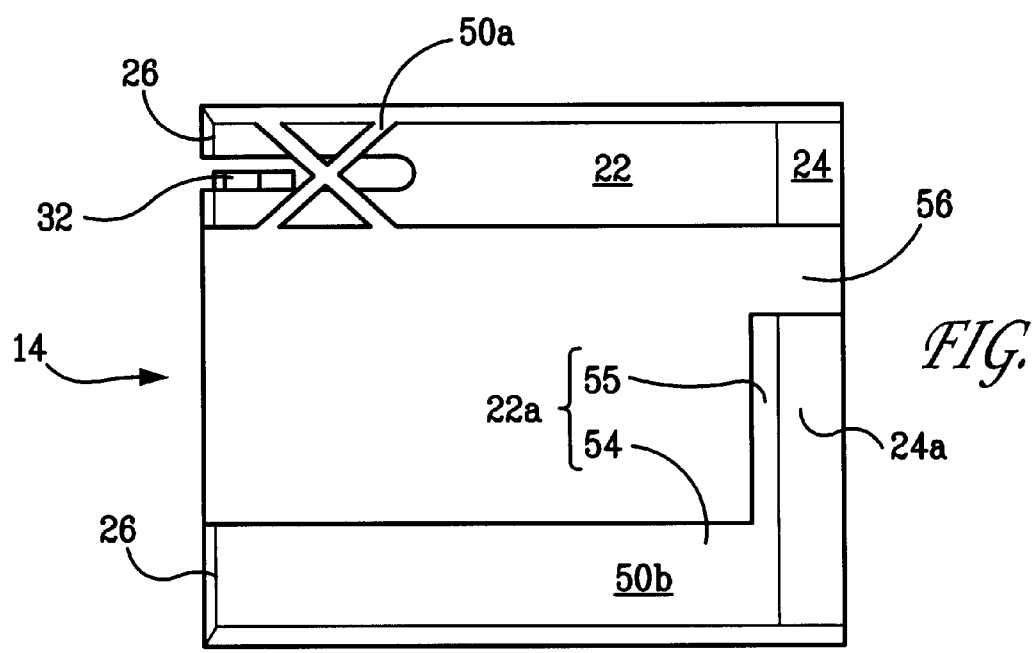
FIG. 16 is a top view of another embodiment of the head assembly of FIG. 1 having a shaped rail air bearing feature.

FIG. 16 shows an alternate shaped rail air bearing feature 50b including a shaped second rail 22a formed as the rail that does not have the sensor 32. As shown in FIG. 16, an L-shaped rail 22a may be provided to control the flow of contaminants 51 in flexible media and to direct debris and contaminants away from the high contact-pressure zone 35. As shown in FIG. 16, the air bearing feature 50b includes an L-shaped leg 22a having a longitudinal portion 54 formed substantially parallel to the longitudinal rail 22 and a transverse portion 55 formed extending across a portion of the leading edge of the slider 14, 16. Preferably, a first longitudinal end 24a of the transverse portion 55 has a shaped leading edge, such as for example, a bevel, a taper, or a step leading edge. The distance that the transverse portion 55 extends across the leading edge of the slider can vary depending on the particular application and the desired amount of flying height and desired contaminant control. An opening 56 is formed between a distal end of the transverse portion 55 of the shaped rail 22a and the longitudinal rail 22 having the sensor 32. As shown, the slider can also include one or more of the shaped slot air bearing features 50a on the first rail 22 having the sensor 32.

Figure 17:
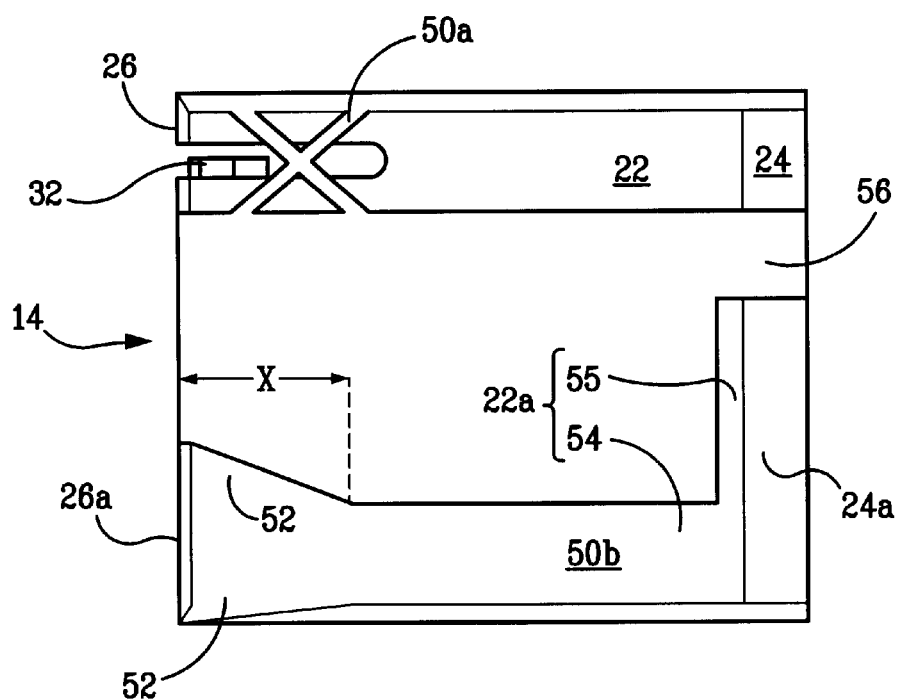
FIG. 17 is a top view of another embodiment of the head assembly of FIG. 16 having skives.

FIG. 17 shows another embodiment wherein the L-shaped rail 22a of FIG. 16 also includes skives 52 formed on the longitudinal portion 54 proximate the second longitudinal end 26a. As shown in FIG. 17, the skives 52 include tapered portion that start at a distance X from the second longitudinal end 26a proximate the trailing edge of the slider 14, 16 and form an inclined surface having a widest width at the second longitudinal end 26a. The inclined surface may be a straight or a curved surface. The skives help to maintain contact with the sensor of the opposed slider and also further helps to control the flow of contaminants.

Figure 18:
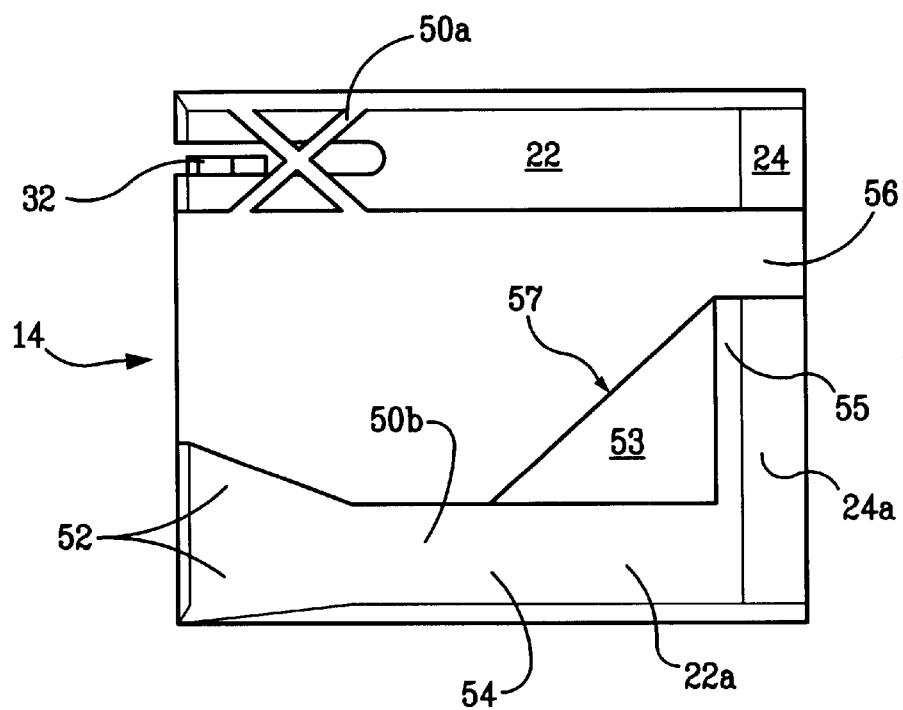
FIG. 18 is a top view of another embodiment of the head assembly of FIG. 17 having a ledge.

FIG. 18 shows the shaped rail air bearing feature 50b of FIG. 17 further including a ledge 53 for further controlling a flow of contaminants between the slider and the flexible media. As shown in FIG. 18, the ledge 53 includes a surface extending from the free distal end of the transverse portion 55 to a point on the longitudinal portion 54. An edge 57 of ledge 53 extends from the distal end of the transverse portion 55 to the longitudinal portion 54 and may be formed as a straight diagonal edge, a curved edge having a concave or convex shape, or any other suitable shape to help control the flow of contaminants. Preferably, the ledge 53 is formed at a depth below the height of the rails 22, 22a (e.g., the rail 22 has a height from the slider 13, 14 that is greater than the height of the ledge 53). The height of ledge 53 can be adjusted based on the particular application to affect the influence of the sub-ambient pressure zone formed by the shaped rail 22a. The height of ledge 53 can be adjusted to control the pressure gradient thereby further controlling the flow of contaminants.

FIGS. 19–24 depict exemplary operation of a head assembly having one or more of the air bearing features 50a, 50b of the present invention for contaminant control in flexible media away from the sensor. Each of the FIGS. 19, 20, 21, 22, 23, and 24 show alternate embodiments of the air bearing features of the invention. In addition, each embodiment shows an exemplary flow of contaminants past the head assembly at three positions relative to the flexible media. A first location (e.g., position A) proximate an inner diameter (ID) of the flexible media, a second location (e.g., position B) proximate the middle diameter (MD), and a third position (e.g., position C) proximate the outer diameter (OD) of the flexible media. In addition, each of the FIGS. 19–24 is a graphical representation of the performance of each of the head assemblies in controlling the flow of contaminants introduced proximate the leading edge of the head as the head moves over the surface of a flexible disk. The vertical axis is the slider width (mm) and the horizontal axis is the slider length (mm).

Each of the FIGS. 19–24 show a plurality of contaminants 51 being introduced along the width of the slider from the leading edge and flowing generally along the longitudinal length of the slider toward the trailing edge. Where the line depicting the contaminant flow ends abruptly, this indicates that the contaminant got hung-up or stuck to the slider. Each of the FIGS. 19–24 show how contaminant flow can be controlled by adding air bearing features 50a, 50b to one or both rails of each slider of the head assembly. Particularly, the air bearing features of the present invention can control the flow of contaminants within the high contact-pressure zone and away from the sensor.

FIGS. 19A, 19B, and 19C show an exemplary head assembly having an X-shaped air bearing feature 50a formed in a center region 58 of one of the longitudinal rails 22 of the slider 14, 16. FIG. 19A shows the exemplary contaminant flow at a position near the inner diameter of the flexible media and shows that contaminants 51 flow generally from the outside of the rail 22 to the inside of the rail 22 and away from the sensor location 32. As shown, the contaminants tend to flow away from the second longitudinal end 26 of the rail having the sensor. FIG. 19B shows the exemplary contaminant flow at a position near the middle diameter of the flexible media and show that contaminants 51 flow generally into the X-shaped slot and then exit and flow away from the sensor location 32. FIG. 19C shows the exemplary contaminant flow at a position near the outer diameter of the flexible media and show that contaminants 51 flow generally from the inside of the rail to the outside of the rail and away from the sensor location. The change in the contaminant flow pattern as between the inner diameter and the outer diameter of the storage medium illustrates the effect of head skew on the flow of contaminants between the slider and the flexible media. The X-shaped air bearing features having an angled entrance point and an angled exit point on both sides of the rail helps account for the effect of head skew.

FIGS. 20A, 20B, and 20C show air bearing features 50a formed in the sensor rail 22 at multiple locations including the center portion 58 of the rail and also proximate the sensor 32. FIGS. 20A, 20B, and 20C show similar contaminant flows as FIGS. 19A, 19B, and 19C respectively. Again, the general flow of contaminants 51 passing between the slider and the flexible media is generally away from the high contact-pressure zone and sensor 32.

FIGS. 21A, 21B, and 21C show the effect on contaminant control of varying the dimensions of the air bearing features 50a. As shown, the width of the shaped air bearing feature 50a was increased from that shown in FIGS. 20A, 20B, and 20C, and the resulting cross flow of contaminants was improved. For example, as shown in FIG. 20A, on of the contaminants flowing along the outside of the rail entered the chevron shaped air bearing feature 50a then became hung-up or stuck at the lower apex of the chevron. However, as shown in FIG. 21A, this same contaminant traveled all the way across or through the air bearing feature 50a from the outside to the inside of the rail 22. Accordingly, this teaches that the performance of the air bearing features in contaminant control can be varied by varying the location and dimensions of the air bearing features.

Figure 22A:
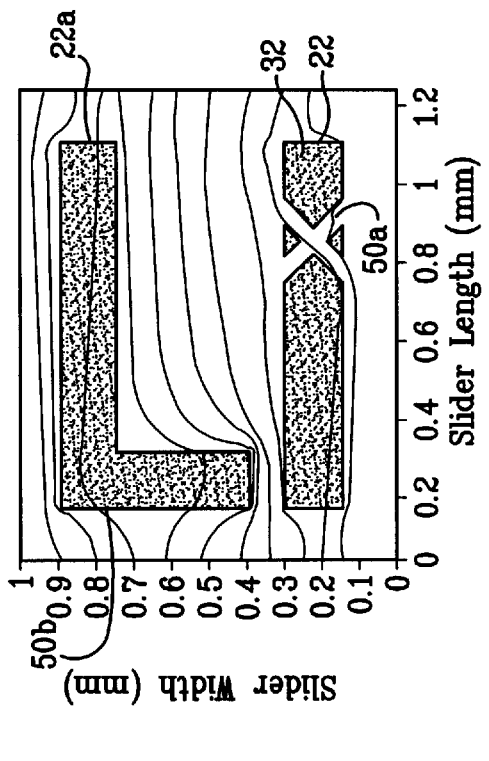
FIGS. 22A, 22B, and 22C show another exemplary contaminant flow formed under another head assembly having a shaped rail air bearing feature for controlling a flow of contaminants away from the sensor.
Figure 22B:
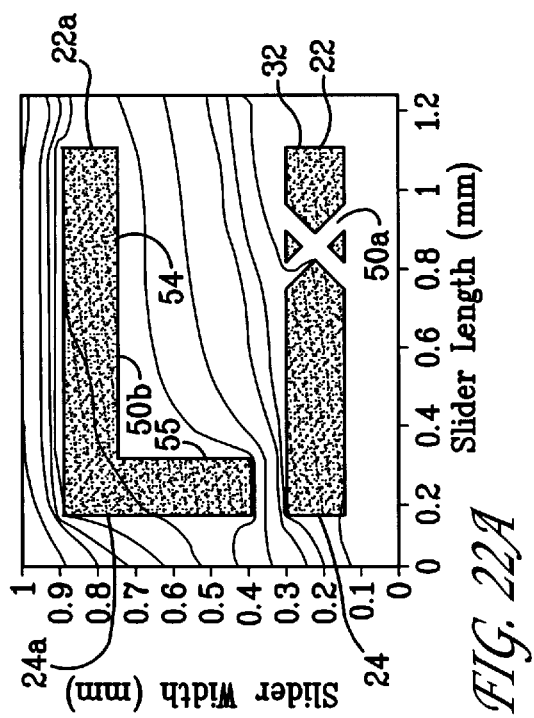
Figure 22C:
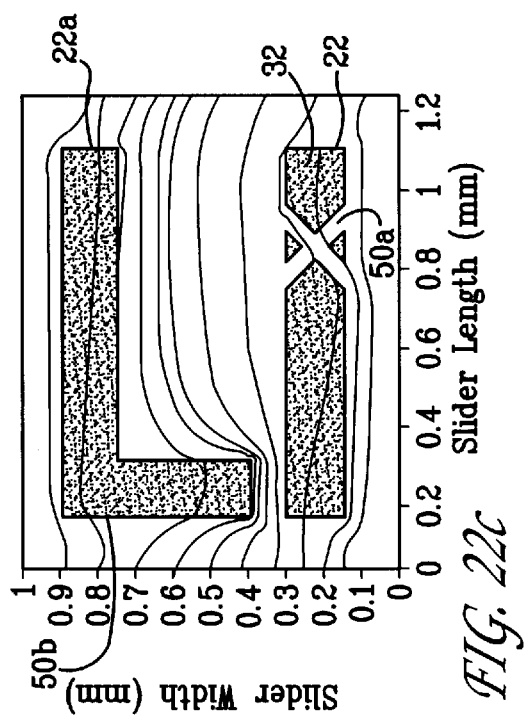

FIGS. 22A, 22B, and 22C show an exemplary head assembly having a shaped rail air bearing feature 50b comprising a shaped rail 22a as the rail that does not have the sensor. FIG. 22A shows the exemplary contaminant flow at a position near the inner diameter of the flexible media and show that contaminants flow generally either around the outside of the shaped rail 22a or through the opening 56 between the distal end of the transverse portion 55 of the shaped rail and the longitudinal rail 22 and then flow toward the longitudinal portion 54 of the shaped rail 22a and away from the sensor location 32. This flow back toward the longitudinal portion is caused by an area of low pressure formed behind the transverse portion of the shaped rail 22a. FIG. 22B shows the exemplary contaminant flow at a position near the middle diameter of the flexible media and shows the same general flows as described with respect to FIG. 22A which are generally away from the sensor location. FIG. 22C shows the exemplary contaminant flow at a position near the outer diameter of the flexible media and shows the same general flows as described with respect to FIG. 22A, but with more contaminants flowing through the opening 56 between the rails and away from the sensor location 32.

FIGS. 23A, 23B, and 23C show the shaped rail embodiment of FIG. 22 also including skives 52 formed proximate the longitudinal rear end 26a of the longitudinal portion 54 of the shaped rail 22a. The skives 52 provide control of contaminant flow around the longitudinal rear end 26a and help to improve the contact of the opposed sensor, thereby improving the performance of the sensor.

Figure 24A:
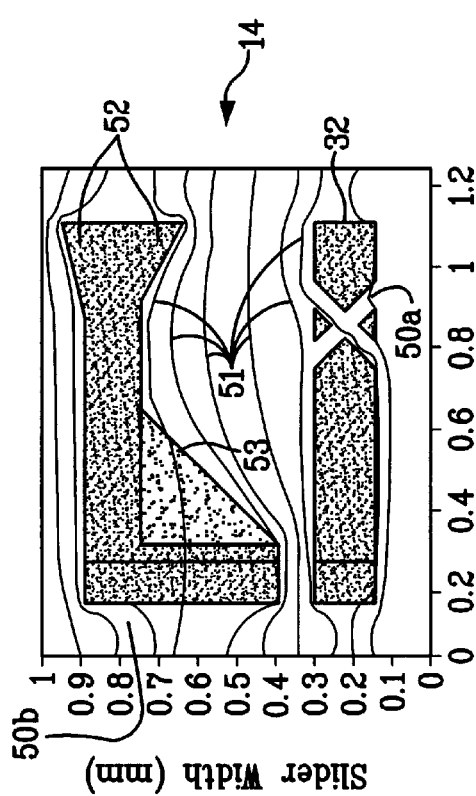
FIGS. 24A, 24B, and 24C show another exemplary air bearing formed under another head assembly of FIGS. 22A, 22B, and 22C further including a ledge.
Figure 24B:
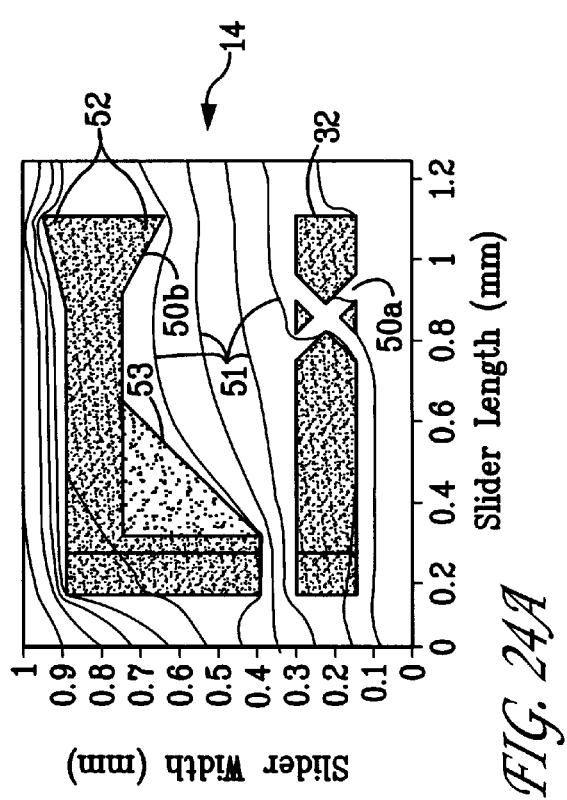
Figure 24C:
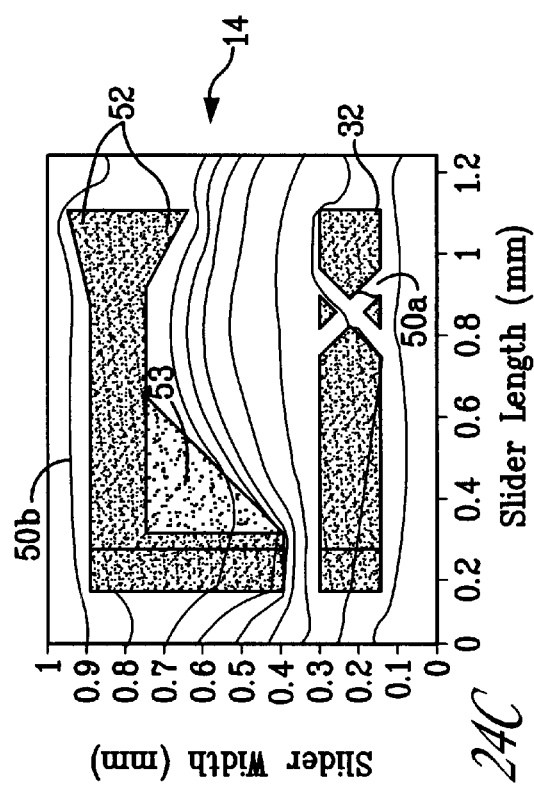

FIGS. 24A, 24B, and 24C show a shaped rail 22a including a ledge 53. As shown, ledge 53 provides a smoother flow path for the contaminants 51 flowing around the shaped rail 22a through opening 56. This helps reduce the amount of contaminants that may accumulate or collect in the area behind the transverse portion 55 of the shaped rail 22a.

It is to be understood, however, that even in numerous characteristics and advantages of the present invention have been set forth in the foregoing description, together with details of the structure and function of the invention, the disclosure is illustrative only, and changes may be made to detail, especially in matters of shape, size and arrangement of parts within the principles of the invention to the full extent indicated by the broad general meaning of the terms in which the appended claims are expressed.

What is claimed is:

1. A head assembly for interfacing with a storage medium of a disk cartridge, comprising:
   a first slider, comprising:
   (i) a first rail, extending longitudinally along said first slider, and having an air bearing feature that extends across an entire width of said first rail, wherein said air bearing feature comprises at least one shaped slot having:
      at least one angled entrance point on an inside edge of said first rail angled toward a leading edge of said first slider;
      at least one angled entrance point on an outside edge of said first rail angled toward said leading edge of said first slider;
      at least one angled exit point on said inside edge of said first rail angled toward a trailing edge of said first slider;
      at least one angled exit point on said outside edge of said first rail angled toward said trailing edge of said first slider;
   (ii) a second rail, extending longitudinally along said first slider;
   (iii) a sensor disposed in a trailing end of said first rail of said first slider for communicating with said storage medium; and
   a second slider aligned with said first slider, comprising
   (i) a first rail, extending longitudinally along said second slider and having an air bearing feature that extends across an entire width of said first rail of said second slider, wherein said air bearing feature comprises at least one shaped slot having:
      at least one angled entrance point on an inside edge of said first rail angled toward a leading edge of said second slider;
      at least one angled entrance point on an outside edge of said first rail angled toward said leading edge of said second slider;
      at least one angled exit point on said inside edge of said first rail angled toward a trailing edge of said second slider;
      at least one angled exit point on said outside edge of said first rail angled toward said trailing edge of said second slider, said first rail of said second slider being aligned with said second rail of said first slider;
   (ii) a second rail, extending longitudinally along said second slider, said second rail of said second slider being aligned with said first rail of said first slider;
   (iii) a sensor disposed in a trailing edge of said first rail of said second slider for communicating with said storage medium; and
   wherein said air bearing feature acts to control a flow of contaminants away from said sensors.

2. The head assembly of claim 1, wherein said shaped slot air bearing feature comprises an X-shape slot.

3. The head assembly of claim 1, wherein said shaped slot air bearing feature is positioned on said first rail proximate a center portion of said first rail.

4. The head assembly of claim 1, wherein said shaped slot air bearing feature is positioned on said rail proximate said sensor.

5. The head assembly of claim 1, wherein said air bearing feature comprises a plurality of shaped slot air bearing features positioned along a longitudinal length of said first rail, wherein said shaped slot air bearing features are positioned both proximate said center region and proximate said sensor.

6. The head assembly of claim 1, wherein said second rail further comprises a shaped rail air bearing feature for controlling a flow of contaminants away from said sensor and a high contact-pressure zone.

7. The head assembly of claim 6, wherein said shaped rail air bearing feature further comprises an L-shaped rail having a longitudinal portion extending substantially parallel to said first rail and a transverse portion extending along a leading edge of said slider from a first longitudinal end of said longitudinal portion to a free distal end, and wherein said transverse portion has a shaped leading edge.

8. The head assembly of claim 7, further comprising an opening formed between said first rail and said distal end of said transverse portion of said shaped second rail proximate said leading edge of said slider.

9. The head assembly of claim 7, said L-shaped rail further comprises skives formed on said longitudinal portion proximate a second longitudinal end for further controlling a flow of contaminants away from said sensor and said high contact-pressure zone.

10. The head assembly of claim 9, wherein said skives further comprise tapered portions that form an inclined surface which inclines toward said second longitudinal end and has a widest width at said second longitudinal end.

11. The head assembly of claim 7, wherein said shaped rail further comprises a ledge extending from a distal end of said transverse portion to a point on said longitudinal portion for further controlling a flow of contaminants away from said sensor and said high contact-pressure zone.

12. The head assembly of claim 11, wherein said ledge includes an edge extending from said distal end of said transverse portion to said longitudinal portion, wherein said edge comprises one of a straight diagonal edge, a curved edge having a concave shape, and a curved edge having a convex shape.

13. The head assembly of claim 1, wherein said storage medium comprises a flexible data storage medium.

14. A disk drive for receiving a disk cartridge that has a storage medium that has a first surface and a second surface, comprising:
 an actuator for communicating with said cartridge and said storage medium;
 a head assembly mounted on said actuator, comprising:
  a first slider, comprising:
   (i) a first rail, extending longitudinally along said first slider, and having an air bearing feature that extends across an entire width of said first rail, wherein said air bearing feature comprises one or more X-shape slots having at least two angled exit points and two angled entrance points;
   (ii) a second rail, extending longitudinally along said first slider;
   (iii) a sensor disposed in a trailing end of said first rail of said first slider; and
  a second slider aligned with said first slider, comprising
   (i) a first rail, extending longitudinally along said second slider and having an air bearing feature that extends across an entire width of said first rail of said second slider, wherein said air bearing feature comprises one or more X-shape slots having at least two angled exit points and two angled entrance points, said first rail of said second slider being aligned with said second rail, of said first slider;
   (ii) a second rail, extending longitudinally along said second slider, said second rail of said second slider being aligned with said first rail of said first slider;
   (iii) a sensor disposed in a trailing edge of said first rail of said second slider; and
  wherein said disk cartridge is inserted so that said first surface of said storage medium is proximal to said first slider and said second surface of said storage medium is proximal to said second slider, said air bearing feature in each of said first rails functioning to control a flow of contaminants away from a high contact-pressure zone defined where said sensor communicates with said storage medium when said storage medium is rotated between said first and said second sliders.

15. The disk drive of claim 14, wherein said head assembly comprises a magnetic head assembly and said sensors comprise electromagnetic sensors for communication with magnetic storage medium.

* * * * *